US007744074B2

(12) United States Patent
Iguchi et al.

(10) Patent No.: US 7,744,074 B2
(45) Date of Patent: Jun. 29, 2010

(54) SHEET PROCESSING APPARATUS AND SHEET PROCESSING METHOD

(75) Inventors: Ken Iguchi, Sunto-gun (JP); Hiroyuki Tsuchihashi, Mishima (JP); Tetsuhiro Morita, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/044,080

(22) Filed: Mar. 7, 2008

(65) Prior Publication Data

US 2008/0308989 A1 Dec. 18, 2008

Related U.S. Application Data

(60) Provisional application No. 60/943,596, filed on Jun. 13, 2007, provisional application No. 60/944,935, filed on Jun. 19, 2007, provisional application No. 60/944,936, filed on Jun. 19, 2007, provisional application No. 60/944,943, filed on Jun. 19, 2007.

(51) Int. Cl.
*B65G 33/04* (2006.01)
*B65G 39/00* (2006.01)

(52) U.S. Cl. ................ 270/58.01; 270/58.08; 270/58.2; 270/58.11

(58) Field of Classification Search .............. 270/58.01, 270/58.08, 58.11
See application file for complete search history.

(56) References Cited

U.S. PATENT DOCUMENTS 7,007,577 B2 * 3/2006 Okamoto et al. ............. 83/76.8
2003/0080487 A1 * 5/2003 Tamura et al. ........... 270/58.07
2006/0202402 A1 * 9/2006 Nagata et al. ............ 270/58.08

FOREIGN PATENT DOCUMENTS

| | | |
|---|---|---|
| JP | 09-249348 | 9/1997 |
| JP | 10-194557 | 7/1998 |
| JP | 2000-153953 | 6/2000 |
| JP | 2005-031877 | 2/2005 |
| JP | 2006-016129 | 1/2006 |

* cited by examiner

*Primary Examiner*—Gene Crawford
*Assistant Examiner*—Yolanda Cumbess
(74) *Attorney, Agent, or Firm*—Turocy & Watson, LLP

(57) ABSTRACT

A sheet processing apparatus includes a hole punching section arranged orthogonally to a conveying path of a sheet, a moving mechanism which moves the hole punching section along a direction orthogonal to the conveying path, a detection unit which is arranged upstream from the hole punching section and which moves by being interlocked with the hole punching section and detects a lateral edge of the sheet conveyed thereto, and a control unit which controls the moving mechanism in accordance with the result of detection by the detection unit and varies the position of the hole punching section, thus controlling the punching processing position. The control unit causes the hole punching section to be moved in the direction to the retreat position along with the conveying of the sheet, causes the hole punching section to retreat by a prescribed quantity with reference to the result of detection by the detection unit, then causes the hole punching section to be moved in the opposite direction, and controls movement to the punching processing position in accordance with the result of detection by the detection unit.

11 Claims, 22 Drawing Sheets

SHEET PROCESSING APPARATUS AND SHEET PROCESSING METHOD

CROSS-REFERENCE TO RELATED APPLICATION

This application is based upon and claims the priority of

U.S. Provisional Application No. 60/943,596, filed on Jun. 13, 2007,

U.S. Provisional Application No. 60/944,935, filed on Jun. 19, 2007,

U.S. Provisional Application No. 60/944,936, filed on Jun. 19, 2007, and

U.S. Provisional Application No. 60/944,943, filed on Jun. 19, 2007, the entire contents of which are incorporated herein by reference.

BACKGROUND OF THE INVENTION

1. Field of the Invention

The present invention relates to a sheet processing apparatus which carried out skew correction and punching processing to a sheet discharged from an image forming unit of MFP (multi-function peripheral), which is a digital multi-function machine, a copy machine, a printer or the like.

2. Description of the Related Art

In an image forming apparatus such as MFP, copy machine or printer, a post-processing device (finisher) is provided next to a paper discharge unit in the image forming apparatus body in order to carry out post-processing such as punching processing and staple processing to a sheet on which an image has been formed.

In such a post-processing apparatus, a sheet discharged from the image forming apparatus body may become slant (hereinafter referred to skew) with respect to the conveying direction. If punching processing (hole punching) is carried out to the skewed sheet, the hole punching position is deviated, causing a trouble at the time of filing. Therefore, a skew correcting unit is provided to correct the skew of the sheet and then punching processing is carried out.

JP-A-2000-153953 discloses a sheet processing apparatus in which a punching unit is movable in a direction that intersects the sheet conveying direction. In this example, the punching unit is moved from the home position (HP) into the direction that intersects the sheet conveying direction and carries out punching. During the operation to move the punching unit to HP after punching is finished, the punching unit is moved to the standby position.

JP-A-2006-16129 discloses a sheet processing apparatus having a pair of rollers for skew correction and a hole punching unit. In this example, the pair of roller for skew correction carries a sheet, and plural edge detection sensors are provided in order to detect the lateral edge of the conveyed sheet.

JP-A-10-194557 discloses a sheet hole punching apparatus having a detection unit which detects the lateral edge of a conveyed sheet. In this example, a hole punching unit is made movable in a direction orthogonal to the sheet conveying direction, and the moving position of the hole punching unit is decided in accordance with the result of detection by the detection unit.

JP-A-2005-31877 discloses a control apparatus for a motor used for conveying a sheet or the like. In this example, the apparatus has a first control system which moves a sheet at a constant speed up to a halfway position before reaching a target stop position, and a second control system which moves the sheet at a low speed from the halfway position to the target stop position. A motor is rotationally driven in two stages.

Moreover, JP-A-9-249348 discloses a punching processing apparatus in which a punching mechanism is movable in a direction orthogonal to the sheet conveying direction. In this example, prior to punching processing, the punching mechanism is moved to a predetermined standby position and caused to wait there. The standby position is preset according to the sheet size.

Meanwhile, high-speed processing and power saving are required of the recent image forming apparatus. As the image forming apparatus operates at a higher speed, the sheet conveying speed becomes higher. Therefore, at the time of punching processing, it is difficult to stop a sheet at a regular position and the position of the punch hole may be deviated. Also, skew correction may take time and measures must be taken to deal with high-speed processing. Moreover, measures for power saving are necessary.

SUMMARY OF THE INVENTION

According to an aspect of the invention, a sheet processing apparatus is provided in which position control of a punching unit can be performed at a higher speed in accordance with high-speed operation of the image forming apparatus.

According to an embodiment of the invention, a sheet processing apparatus includes: a hole punching section arranged, in order to perform punching processing to a sheet conveyed thereto, orthogonally to a conveying path of the sheet; a moving mechanism configured to move the hole punching section along a direction orthogonal to the conveying path and move the hole punching section in a direction toward a retreat position and a punching processing position; a detection unit arranged upstream from the hole punching section and configured to move by being interlocked with the hole punching section and detect a lateral edge of the sheet conveyed thereto; and a control unit configured to control the moving mechanism in accordance with a result of detection by the detection unit and vary the position of the hole punching section, thus controlling the punching processing position with respect to the sheet. The control unit causes the hole punching section to be moved in the direction to the retreat position along with the conveying of the sheet, causes the hole punching section to retreat by a prescribed quantity with reference to the result of detection by the detection unit, then causes the hole punching section to be moved in the opposite direction, and controls movement to the punching processing position in accordance with the result of detection by the detection unit.

DETAILED DESCRIPTION OF THE INVENTION

Figure 1:
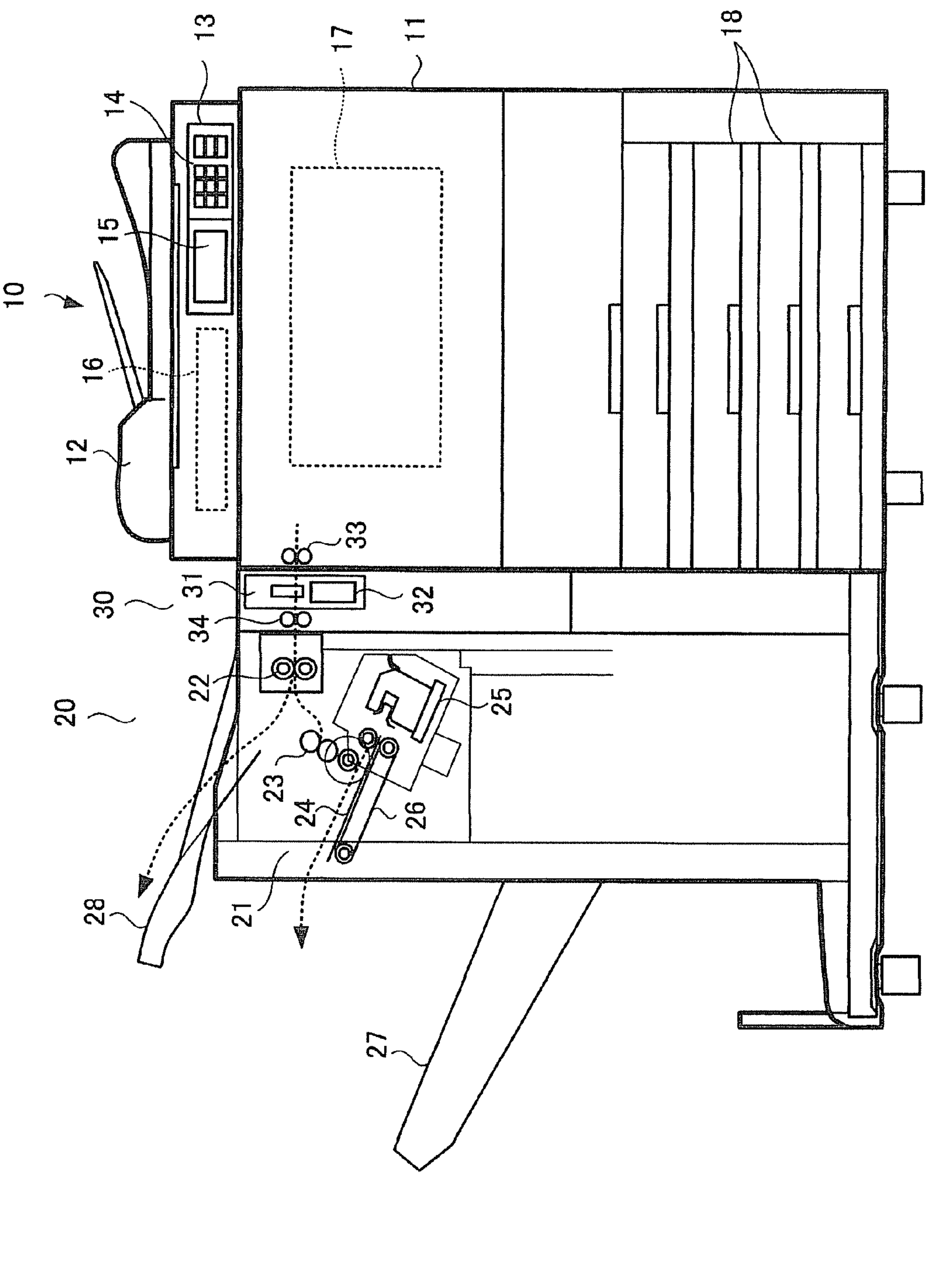
FIG. 1 is a configuration view for explaining the overall structure of an image forming apparatus according to an embodiment of the invention.

Throughout this description, the embodiments and examples shown should be considered as exemplars, rather than limitations on the apparatus of the present invention.

Hereinafter, an embodiment of the invention will be described in detail with reference to the drawings. In the drawings, the same parts and components are denoted by the same reference numerals.

FIG. 1 is a configuration view showing an image forming apparatus including a sheet processing apparatus according to an embodiment of the invention.

In FIG. 1, 10 refers to an image forming apparatus. The image forming apparatus 10 includes a body 11 forming an image forming unit, and a sheet processing apparatus 20 connected to the body 11.

In the following description, an MFP (multi-function peripheral), which is a multi-function machine, is employed as an example of the image forming apparatus. However, the invention can also be applied to other image forming apparatuses such as a printer or copy machine.

A document table (not shown) is provided at the top of the body 11 of the image forming apparatus 10. An automatic document feeder (ADF) 12 is provided on the document table in such a manner that it can freely open and close. Moreover, an operation panel 13 is provided at the top of the body 11. The operation panel 13 has an operation unit 14 including various keys, and a touch-panel display unit 15.

The operation unit 14 has, for example, ten keys, a reset key, a stop key, a start key and so on. With the touch-panel display unit 15, the user can designate sheet size, the number of copy sheets, punching processing and the like.

In the body 11, a scanner unit 16 and a printer unit 17 are provided. At the bottom of the body 11, plural cassettes 18 are provided in which sheets of various sizes are housed. The scanner unit 16 reads a document fed by the ADF 12 or an original set on the document table.

The printer unit 17 includes a photoconductive drum and a laser. A laser beam from the laser scans and exposes light to the surface of the photoconductive drum, and thus forms an electrostatic latent image on the photoconductive drum. A charger, a developing device, a transfer device are arranged around the photoconductive drum. The electrostatic latent image on the photoconductive drum is developed by the developing device, and a toner image is formed on the photoconductive drum. The toner image is transferred to a sheet by the transfer unit.

The configuration of the printer unit 17 is not limited to the above example and various systems can be employed. The sheet processing apparatus 20 is arranged to the paper discharge side of the body 11. The sheet processing apparatus 20 is generally called a finisher. In the following description, it is referred to as finisher 20.

A sheet on which an image has been formed by the body 11 (image forming unit) is conveyed to the finisher 20. The finisher 20 carries out post-processing of the sheet supplied from the body 11, for example, punching processing, sorting processing, staple processing and so on.

The finisher 20 shown in FIG. 1 has a staple mechanism 21 which performs staple processing to a bundle of sheet, and a punching mechanism 30 which performs punching processing to a sheet. The post-processed sheet is discharged to a paper storage tray 27 or a fixed tray 28.

The paper storage tray 27 is movable and receives the bundle of sheet to which punching processing or staple processing has been performed. The staple mechanism 21 has an alignment device which aligns the sheets conveyed thereto in the direction of width. This alignment device can be used to sort and discharge sheets. In the case where post-processing is not carried out, the sheet conveyed from the body 11 is directly discharged to the paper storage tray 27 or the fixed tray 28, without being processed in any way.

The staple mechanism 21 of the finisher 20 will now be briefly described. A sheet supplied from the body 11 via the punching mechanism 30 is received by entrance rollers 22 provided near a carry-in port of the finisher 20. Paper feed rollers 23 are provided downstream of the entrance rollers 22. The sheet received by the entrance rollers 22 is stacked on a processing tray 24 via the paper feed rollers 23.

The sheet stacked on the processing tray 24 is guided to a stapler 25 and staple processing is performed. Also, a conveying belt 26 is provided which carries the sorted or stapled sheet to the paper storage tray 27.

The sheet conveyed by the conveying belt 26 is discharged to the paper storage tray 27. The paper storage tray 27 is moved up and down by a driving unit (not shown) and receives the sheet.

There is a case where a sheet is discharged to the paper storage tray 27 without being stapled. In this case, the sheet is discharged without being dropped on the processing tray 24. The sheet which requires no post-processing can also be discharged to the fixed tray 28. A conveying path to guide the sheet to the fixed tray 28 is provided, though not shown.

Next, the punching mechanism 30 will be described. The punching mechanism 30 is arranged between the body 11 and the staple mechanism 21, and has a punching unit 31 and a dust box 32.

The punching unit 31 is provided with a hole punching cutter (not shown) which conveyed out punching processing to a sheet. As this hole punching cutter moves down, a punch hole is opened in the sheet. The part of the sheet that is punched out by punching processing falls into the dust box 32.

In the route from the body 11 to the entrance rollers 22 of the staple mechanism 21, plural rollers 33 and 34 for conveying a sheet are provided. The rollers 33 are provided in the body. The rollers 34 are provided at the final exit of the punching mechanism 30. A sheet discharged from the body 11 is conveyed to the punching mechanism 30 by the rollers 33 and is then conveyed to the staple mechanism 21 by the rollers 34.

The punching processing by the punching unit 31 is executed when the punch mode has been set by the user's operation of the operation panel 13.

Figure 2:
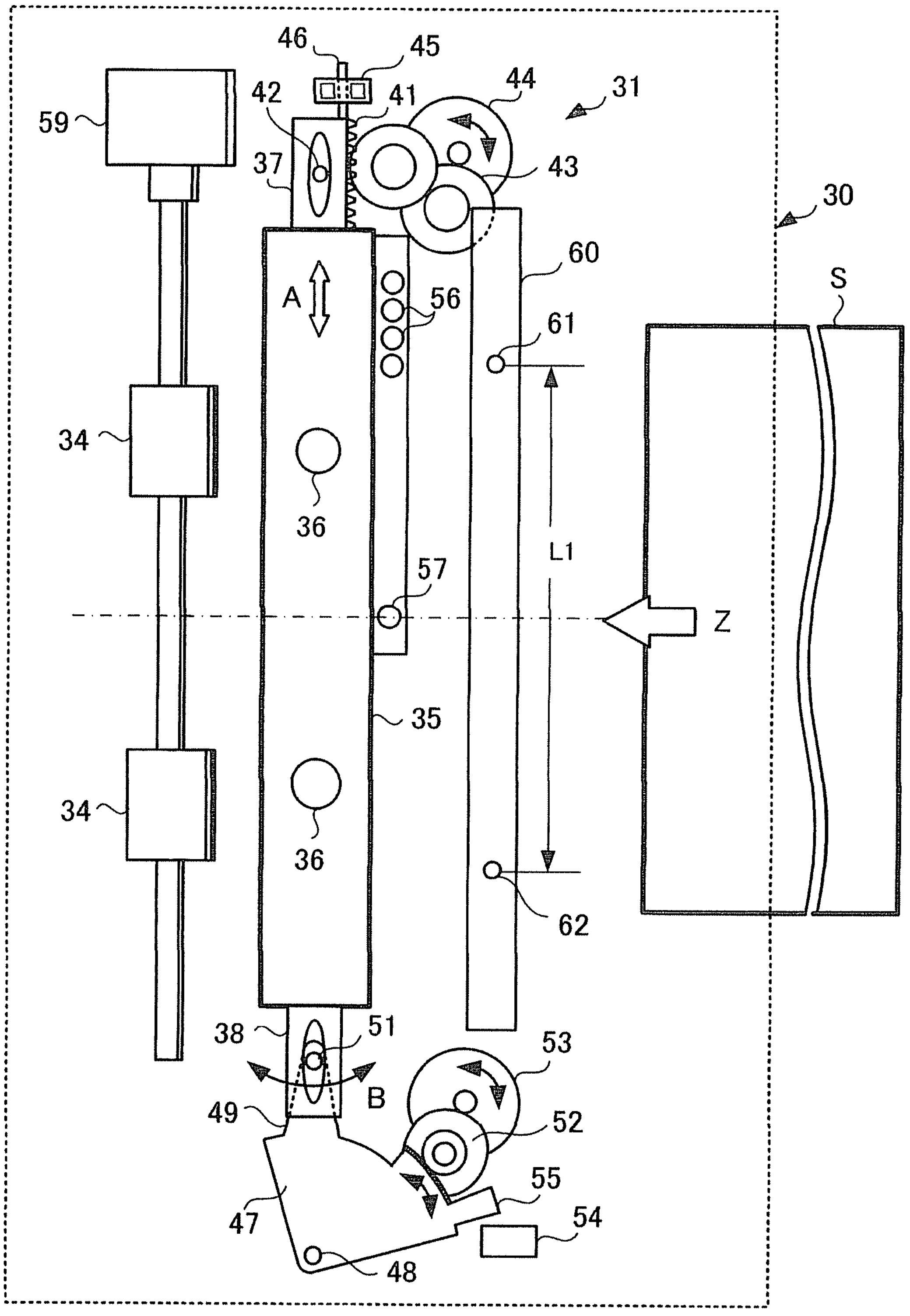
FIG. 2 is a plan view showing the configuration of a sheet processing apparatus according to the one embodiment of the invention.

Hereinafter, the configuration of the punching mechanism 30 of the sheet processing apparatus according to one embodiment of the invention will be described in detail with reference to FIG. 2. In FIG. 2, the punching mechanism 30 has the punching unit 31. The dust box 32 is not shown in FIG. 2. The punching unit 31 has the function of performing punching processing to a sheet S and correcting a skew of the sheet S.

The punching unit 31 has a hole punching section 35 which punches a punch hole in the sheet S conveyed therein from the body 11, and a skew detection unit 60 to detect a skew. The hole punching section 35 is provided downstream of the skew detection unit 60.

The skew detection unit 60 and the hole punching section 35 are arranged substantially parallel to each other and orthogonally to the sheet conveying direction Z. The hole punching section 35 is provided with plural (in FIG. 2, two) hole punching cutters 36.

Figure 3:
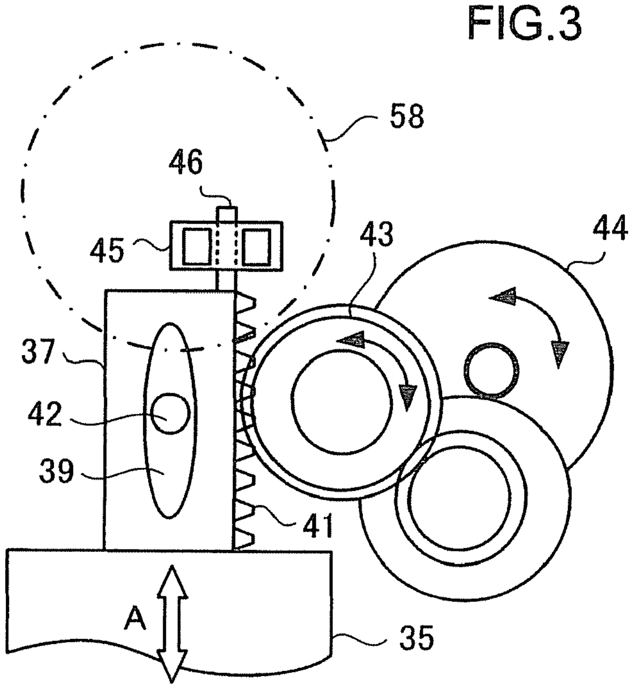
FIG. 3 is a plan view showing a moving mechanism for a hole punching section in the sheet processing apparatus according to the one embodiment of the invention.

The hole punching cutters 36 are driven to rise and fall by rotation of a punch motor 58 (FIG. 3). As the hole punching cutters 36 move down in the direction toward the sheet face of the sheet S, punch holes can be punched in the sheet S. The driving mechanism to move the hole punching cutters 36 up and down is not shown in the drawing, since it is generally known.

The hole punching section 35 is movable in the direction of the arrow A (lateral direction) orthogonal to the conveying direction Z of the sheet S. One end (lower end in FIG. 2) of the hole punching section 35 can be turned within a predetermined range in the direction of the arrow B (longitudinal direction) along the conveying direction of the sheet S.

A moving mechanism to move the hole punching section 35 in the lateral direction (the direction of the arrow A) is shown in an enlarged view of FIG. 3. A mechanism to turn the hole punching section 35 in the longitudinal direction (the direction of the arrow B) and thus control its attitude is shown in an enlarged view of FIG. 4.

Figure 4:
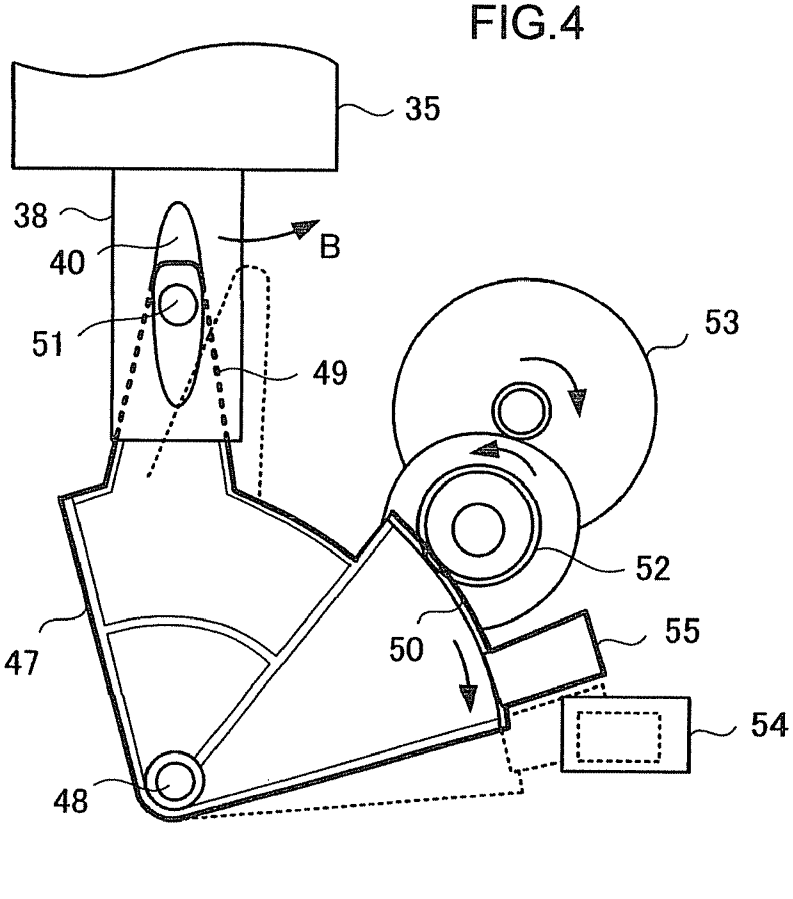
FIG. 4 is a plan view showing a rotation mechanism for the hole punching section in the sheet processing apparatus according to the one embodiment of the invention.

As shown in FIG. 3 and FIG. 4, protruding flaps 37 and 38 are provided at both edges in the axial direction of the hole punching section 35. Elongated holes 39 and 40 are formed in the protruding flaps 37 and 38. A rack 41 is formed on the lateral side of one protruding flap 37. A fixed shaft 42 provided on the body side of the finisher 20 is fitted in the elongated hole 39 in the protruding flap 37. Therefore, the hole punching section 35 is movable in the direction of the arrow A within the length of the elongated hole 39, with the fixed shaft 42 as its guide.

In order to move the hole punching section 35 in the lateral direction (direction A), a gear group 43 is provided which meshes with the rack 41 and thus rotates. To rotate this gear group 43, a lateral registration motor 44 is provided.

Moreover, a sensor 45 is arranged at a position at a predetermined distance from the protruding flap 37. The sensor 45 is to detect that the hole punching section 35 has moved in the direction of the arrow A and has reached its home position (hereinafter, it may also be called HP). The protruding flap 37 is provided with a shutter 46 which is formed to extend in the direction to the sensor 45. As the shutter 46 traverses the sensor 45, the sensor detects that the hole punching section 35 has moved to the home position in the direction A.

Meanwhile, a sectorial cam 47 to rotate the hole punching section 35 in the direction of the arrow B is connected to the protruding flap 38 of the hole punching section 35. The cam 47 turns about a shaft 48 as a fulcrum which is provided on the body side of the finisher 20. The cam 47 has a lever 49 at its one end and has a gear 50 formed at its other end. The lever 49 is provided with a shaft 51. This shaft 51 is fitted in the elongated hole 40 in the protruding flap 38.

Moreover, to rotate the hole punching section 35 in the longitudinal direction (direction B), a gear group 52 is provided which meshes with the gear 50 and thus rotates. A longitudinal registration motor 53 is provided to rotate this gear group 52. As the longitudinal registration motor 53 rotates, the cam 47 rotates and thus the lever 49 turns. The hole punching section 35 turns in the longitudinal direction (direction B) about the fixed shaft 42 as its fulcrum.

Also, a sensor 54 is arranged at a position at a predetermined distance from the cam 47. The sensor 54 is to detect that the hole punching section 35 has turned in the direction of the arrow B and has turned to the home position, as shown in FIG. 4. A shutter 55 extending in the direction to the sensor 54 is formed on the cam 47. As the shutter 55 traverses the sensor 54, the sensor detects that the hole punching section 35 has turned to the home position.

In this way, the hole punching section 35 can be moved in the lateral direction (direction A) by the rotation of the lateral registration motor 44 and can be turned in the longitudinal direction (direction B) by the longitudinal registration motor 53. The above-described moving mechanism in the lateral direction (direction A) and the rotation mechanism in the longitudinal direction (direction B) form a moving mechanism for the hole punching section 35.

The moving distance of the hole punching section 35 is managed by the number of pulses when driving the lateral registration motor 44. Similarly, the rotation control of the hole punching section 35, that is, its angle, is managed by the number of pulses when driving the longitudinal registration motor 53.

On the sheet S carry-in side of the hole punching section 35, a sensor group 56 to detect the edge in the lateral direction (lateral edge) of the sheet S is provided, and also a sensor 57 is provided which detects the edges in the longitudinal direction (forward edge and rear edge) when the sheet S is conveyed. The sensor 57 forms a first detection unit. The sensor group 56 forms a second detection unit.

In the sensor group 56 and the sensor 57, for example, a light emitting device and a light receiving device are arranged to face each other, and when the sheet is conveyed and passes between the light emitting device and the light receiving device, the lateral edge, forward edge and rear edge of the sheet S are detected.

Meanwhile, sensors 61 and 62 for skew detection are provided in the skew detection unit 60. Also in these sensors 61 and 62, for example, a light emitting device and a light receiving device are arranged to face other, and when the sheet S is conveyed out and passes between the light emitting device and the light receiving device, the skew of the sheet is detected.

That is, the sensors 61 and 62 are arranged on the upstream side in the punching unit 31 and detect the passage of the forward edge and the rear edge of the sheet S conveyed thereto. The sensor 61 and the sensor 62 are provided in parallel orthogonally to the sheet conveying direction, at positions at a predetermined distance L1 from each other on the inner side than the minimum width dimension of the sheet S having the minimum sheet width that enables punching processing, as shown in FIG. 2.

Detection signals from the sensors 61 and 62 are sent to a control unit, which will be described later. The control unit is provided with timer counters. The timer counters start counting time when the sensors 61 and 62 has detected the passage of the forward edge of the sheet S. For example, in the case where the sheet S is not tilted at all with respect to the conveying direction, the sensors 61 and 62 simultaneously detect the passage of the forward edge of the sheet S. Therefore, the timer counters simultaneously start counting and no time difference occurs.

On the other hand, in the case where the sheet S is tilted because of a skew as it is conveyed, since the first sensor 61 and the second sensor 62 are fixed at a predetermined distance from each other, a time difference occurs in the passage of the sheet S detected by the sensors 61 and 62. Thus, it can be known that the sheet S is skewed.

In the case where the sheet S is inserted in a skewed state and, for example, the sensor 61 first detects the sheet S and then the sensor 62 detects the sheet S, a skew error distance (a) is calculated from the time difference in the detection and the conveying speed V. If the distance between the first sensor 61 and the second sensor 62 is L1 and the skew angle is (θ), the following equation (1) holds.

$$a = L1 \times \tan\theta \quad (1)$$

As the skew angle θ is calculated from this equation (1), the longitudinal registration motor 53 is driven at the number of pulses enough to rotate the hole punching section 35 by the angle θ. Thus, the hole punching section 35 is tilted and skew correction is carried out in accordance with the quantity of skew of the sheet.

As the lateral registration motor 44 and the longitudinal registration motor 53, stepping motors are suitable in which the number of rotations can be controlled by the number of pulses or frequency. The conveying rollers 34 are driven at a predetermined number of rotations by a conveying motor 59 and carry the sheet S conveyed thereto from upstream (the entrance of the punching unit 31), to downstream (the exit of the punching unit 31) at the conveying speed V.

Figure 5:
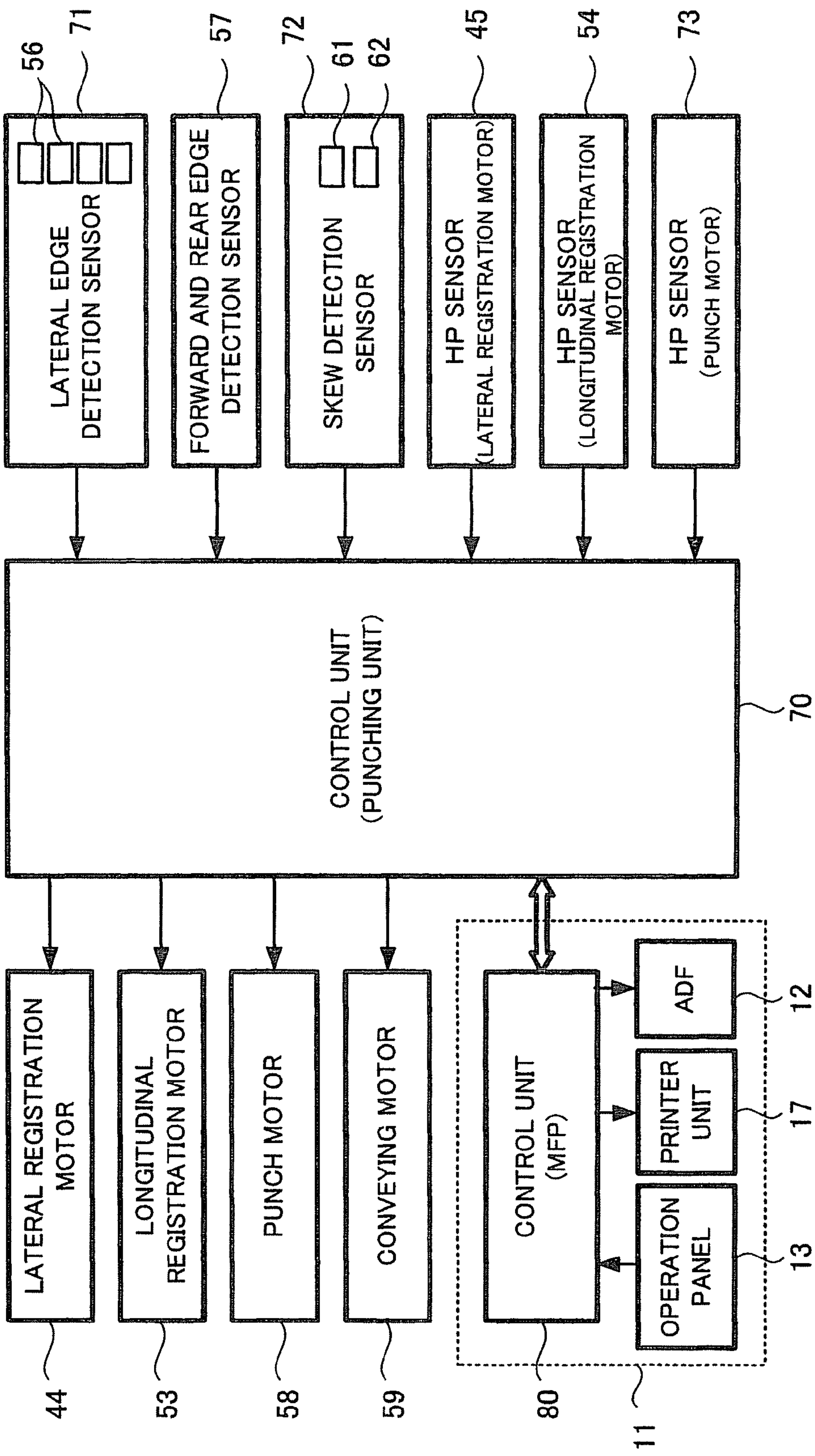
FIG. 5 is a block diagram showing a control system of the sheet processing apparatus according to the one embodiment of the invention.

Next, the control system to drive the punching unit 31 will be described with reference to FIG. 5. FIG. 5 is a block diagram showing the control system of the punching unit 31.

In FIG. 5, 70 refers to a control unit which controls the punching unit 31. The control unit 70 includes a central processing unit (CPU), RAM, ROM and so on. A lateral edge detection sensor 71 including the sensor group 56, the sensors 57 which detects the forward edge and rear edge of the sheet S, a skew detection sensor 72 including the sensors 61 and 62, and home position sensors 45, 54 and 73 are connected to the control unit 70. The results of detection from these sensors are inputted to the control unit 70.

Also, the lateral registration motor 44, the longitudinal registration motor 53, the punch motor 58 and the conveying motor 59 for conveying the sheet are connected to the control unit 70. The control unit 70 controls the rotation of each motor in response to the result of detection from the above various sensors.

The home position sensor 45 is to detect a home position when the hole punching section 35 has been moved in the lateral direction (direction A) by the lateral registration motor 44. The home position in the lateral direction is the center part of the conveying path for the sheet S.

The home position sensor 54 is to detect a home position when the hole punching section 35 has been turned in the longitudinal direction (direction B) by the longitudinal registration motor 53. The home position in the longitudinal direction is the position where the hole punching section 35 is tilted most.

The home position sensor 73 is to detect a home position when the hole punching cutters 36 have been moved up and down by the punch motor 58. The home position of the hole punching cutters 36 is the position in the state where the hole punching cutters 36 have been pulled out of the sheet S, that is, the position away from the sheet face of the sheet S.

Moreover, a control unit 80 for controlling the body (MFP) 11 is connected to the control unit 70. The various parts of the body 11, for example, the operation panel 13, the printer unit 17, the ADF 12 and so on are connected to the control unit 80.

The control unit 70 and the control unit 80 operate in an interlocked manner to designate punching processing, designate a sheet size, and so on in accordance with the operation on the operation panel 13. In response to this, the punching unit 31 executes conveying of the sheet S, skew correction, punching processing and so on.

Next, the basic operation of the punching unit 31 of the invention will be described with reference to FIG. 6A to FIG. 6D.

Figure 6B:
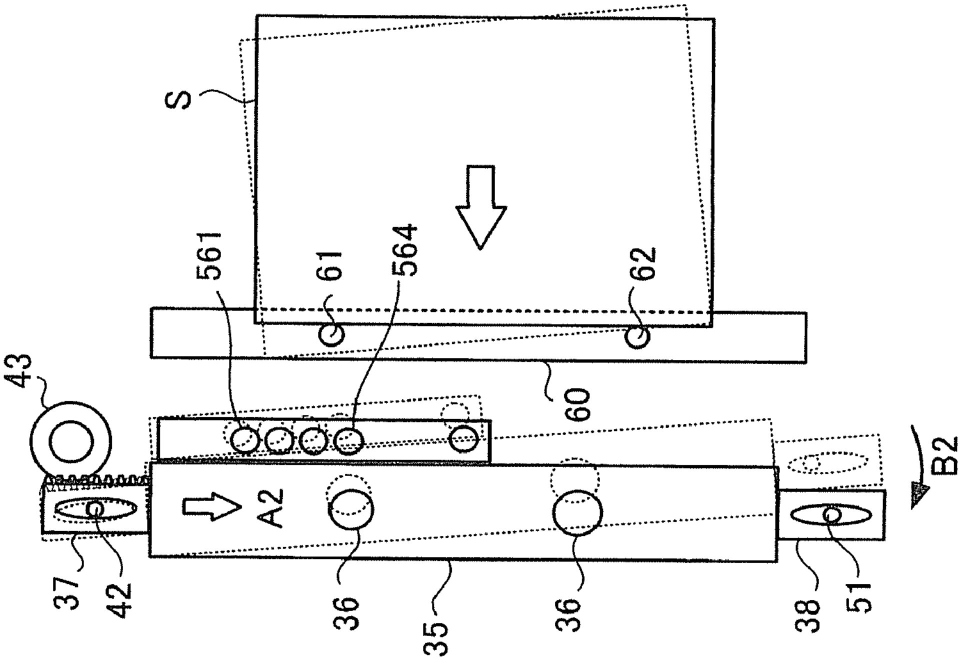
FIG. 6A to FIG. 6D are plan views for explaining a basic operation of the sheet processing apparatus according to the one embodiment of the invention.
Figure 6A:
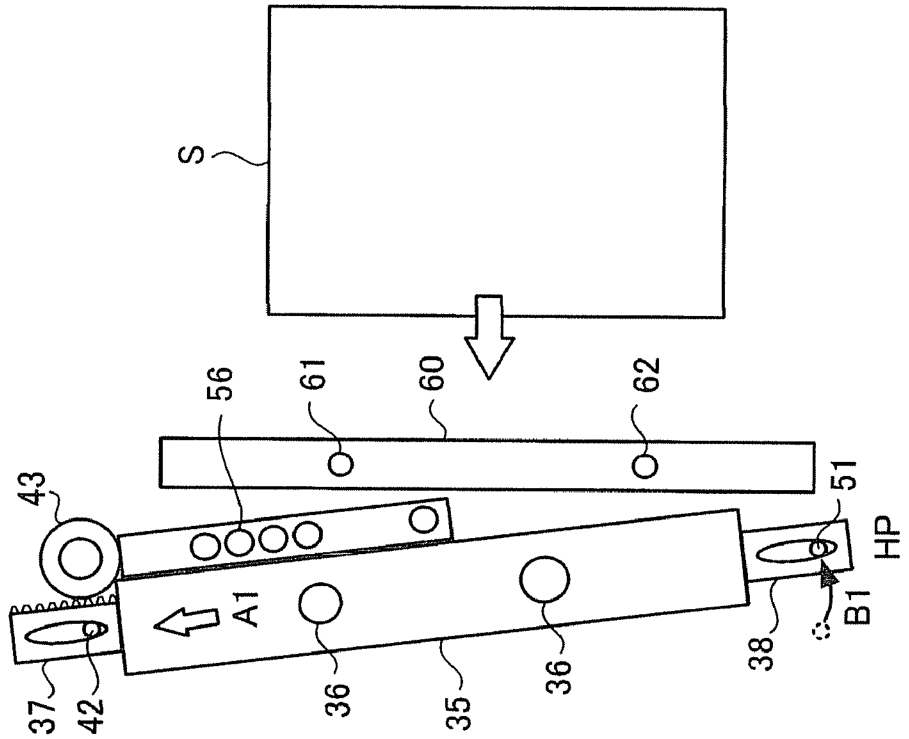

FIG. 6A shows the initial state of the punching unit 31. That is, when the control unit 70 has received an instruction of punching processing from the body 11, the control unit 70 drives the longitudinal registration motor 53 and the hole punching section 35 turns in the direction of the arrow B1 along the sheet S conveying direction and is set in a tilted state. This state is the home position in the longitudinal direction. The control unit 70 also drives the lateral registration motor 44 and the hole punching section 35 is moved in the direction of the arrow A1 orthogonal to the sheet S conveying direction by the gear group 43 and is set at the retreat position.

After that, when the sheet S is conveyed in, the skew detection unit 60 detects skew at the forward edge of the sheet S. As the quantity of skew is detected by the skew detection unit 60, the control unit 70 drives the longitudinal registration motor 53 and the hole punching section 35 is turned and tilted in the direction of the arrow B2 in accordance with the quantity of skew of the sheet S conveyed therein, as shown in FIG. 6B.

The thin dotted line in FIG. 6B indicates the state where the sheet S is skewed and the hole punching section 35 is tilted in accordance with the quantity of skew. When the sheet S is not skewed, the hole punching section 35 has its attitude controlled at the angle orthogonal to the sheet S conveying direction, as indicated by the solid line. The rotation mechanism for the hole punching section 35 is controlled by the control unit 70 and forms an attitude control unit for the hole punching section 35.

Next, when the forward edge of the sheet S is detected by the sensor 57 and it is detected that the sheet has been conveyed by a prescribed quantity, the lateral registration motor 44 is driven and the hole punching section 35 is moved in the direction of the arrow A2 from the retreat position toward the center of the conveying path. In this stage of movement, the sensor group 56 detects the lateral edge of the sheet S along the conveying direction.

In the detection of the lateral edge, a sensor of the sensor group 56 is designated in accordance with the sheet size designated through the operation panel 13, and the lateral edge is detected by the designated sensor. For example, the lateral edge of an A4 sheet is detected by an outer sensor 561. For a small sheet size, the lateral edge is detected by an inner sensor 564. As the lateral edge is detected by a sensor of the sensor group 56, the lateral registration motor 44 stops and also the hole punching section 35 stops moving.

Figure 6D:
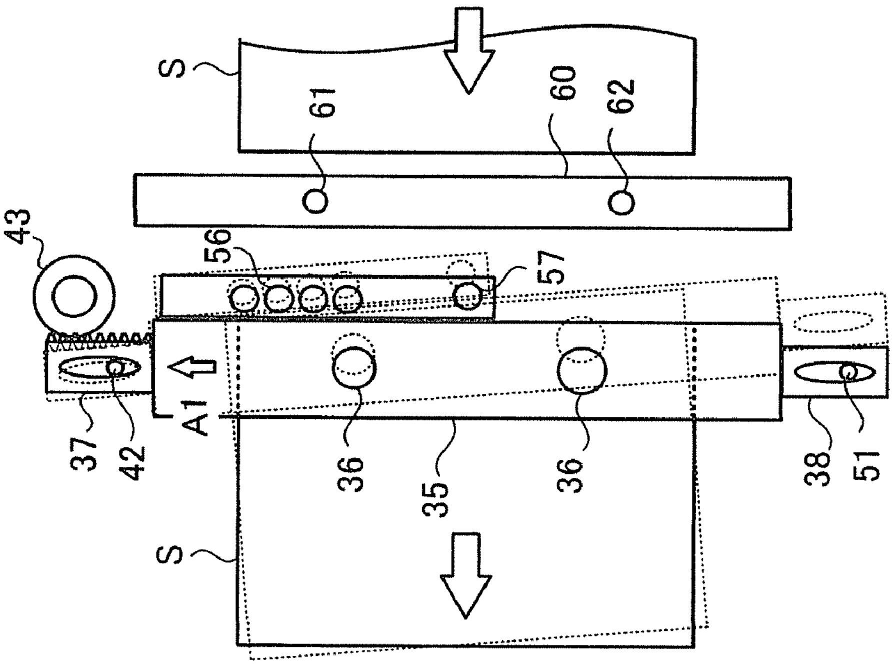
Figure 6C:
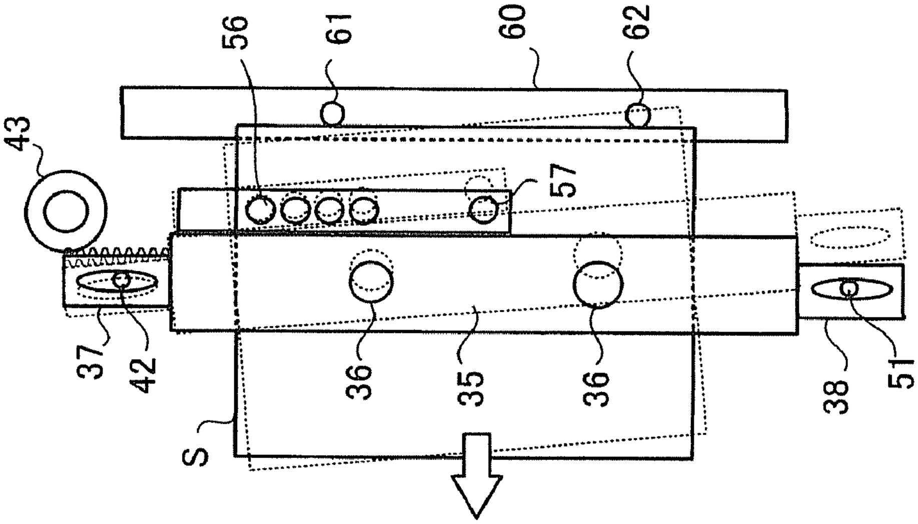

After that, when the sheet S is further conveyed, as shown in FIG. 6C, the skew detection unit 60 detects the quantity of skew at the rear edge of the sheet S. At this point, if there is a difference between the quantity of skew at the forward edge and the quantity of skew at the rear edge, the longitudinal registration motor 53 is driven to make fine adjustment of the tilt of the hole punching section 35 by the amount of the difference. In this case, if the lateral edge of the sheet S is shifted, the lateral registration motor 44 is driven to make fine adjustment of the position of the hole punching section 35 in the lateral direction as well.

Then, after the rear edge of the sheet S is detected by the sensor 57, the sheet S is conveyed by a predetermined quantity from that position to a prescribed position where punching processing is to be carried out, as shown in FIG. 6D, and driving of the conveying motor 59 is stopped. The punch motor 58 is driven in this state to lower the hole punching cutters 36, thus punching punch holes in the sheet S.

Driving of the punch motor 58 may be started in timing before the conveying motor 59 stops, in consideration of the time taken for the hole punching cutters 36 to be butted against the sheet. In this case, driving of the punch motor 58 may be started after the lapse of a predetermined period from when the rear edge of the sheet S is detected by the sensor 57.

As the hole punching processing ends, the control unit 70 drives the conveying motor 59 again to discharge the punched sheet. If there is a subsequent sheet, the processing of FIG. 6A to FIG. 6D is repeated. If there is no subsequent sheet, each device is set at the home position (HP) and the processing ends.

Figure 7:
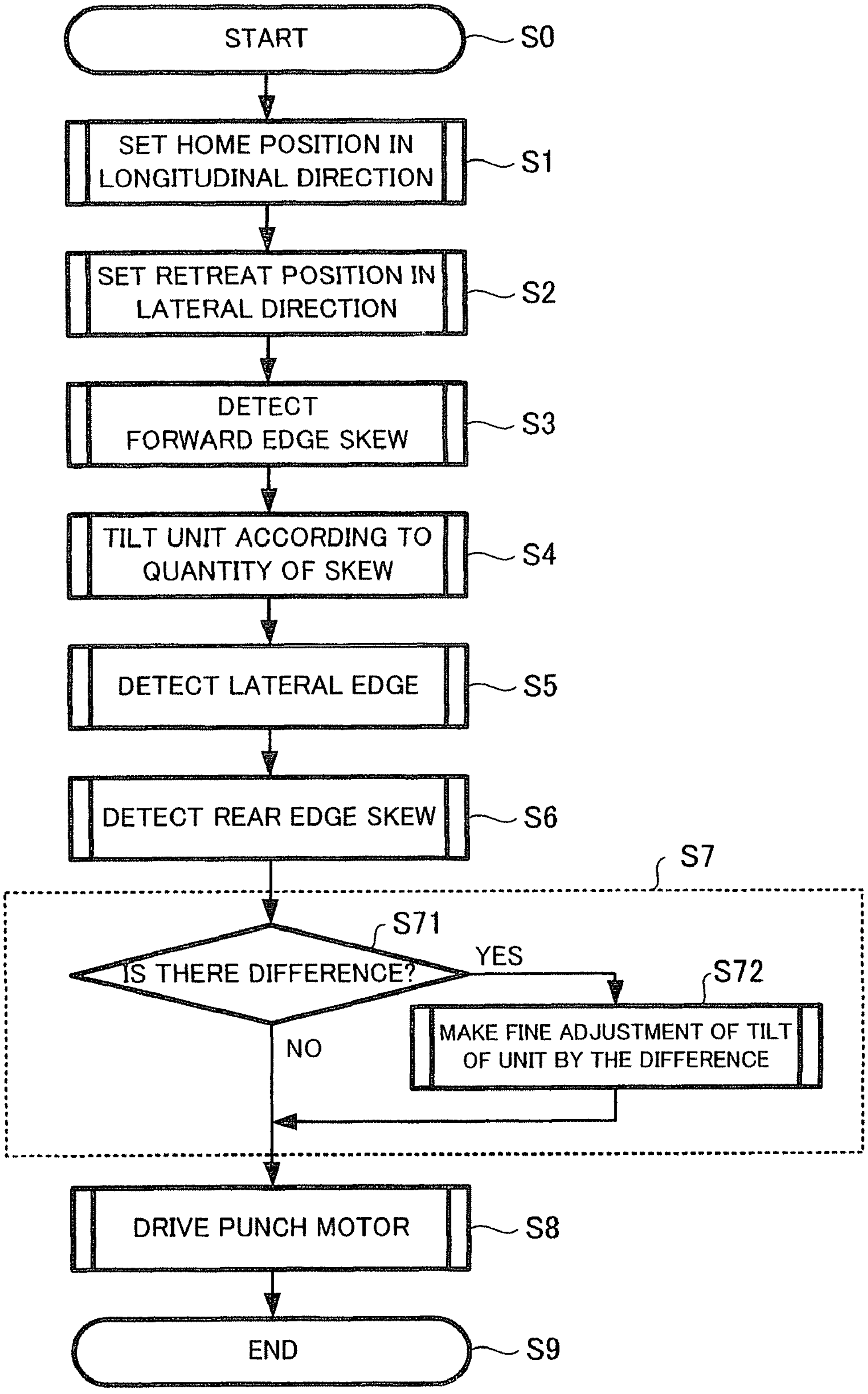
FIG. 7 is a flowchart for explaining the basic operation of the sheet processing apparatus according to the one embodiment of the invention.

FIG. 7 is a flowchart for explaining the above operations.

In FIG. 7, S0 is the step to start punching processing. In step S1, the longitudinal registration motor 53 is driven and the hole punching section 35 is turned in the longitudinal direction and set at the home position. In step S2, the lateral registration motor 44 is driven and the hole punching section 35 is moved in the direction of the arrow A1 orthogonal to the sheet S conveying direction and is set at the retreat position.

In step S3, the skew detection unit 60 detects the skew at the forward edge of the sheet S conveyed therein. As the quantity of skew is detected by the skew detection unit 60, the longitudinal registration motor 53 is driven and the hole punching section 35 is turned and tilted in accordance with the quantity of skew of the sheet S conveyed therein, in step S4.

Next, when the forward edge of the sheet S is detected by the sensor 57, the lateral registration motor 44 is driven and the hole punching section 35 is moved from the retreat position toward the center of the conveying path. In step S5, the sensor group 56 detects the lateral edge of the sheet S. As the lateral edge is detected, the lateral registration motor 44 is stopped and also the hole punching section 35 stops moving. After that, as the sheet S is conveyed further, the skew detection unit 60 detects the quantity of skew at the rear edge of the sheet S, in step S6.

In step S71 of step S7, it is determined whether there is a difference between the quantity of skew at the forward edge and the quantity of skew at the rear edge. If there is a difference, the longitudinal registration motor 53 is driven to make fine adjustment of the tilt of the hole punching section 35 by the amount of the difference, in step S72. In this case, if there is a shift of the lateral edge of the sheet S, the lateral registration motor 44 is driven to make fine adjustment of the hole punching section 35 in the lateral direction as well.

After skew correction is done, the sheet S is conveyed by the predetermined quantity to the prescribed position where punching processing is to be carried out, and driving of the conveying motor 59 is stopped. In step S8, the punch motor 58 is driven to lower the hole punching cutters 36, thus punching punch holes in the sheet S. As the hole punching processing ends, the conveying motor 59 is driven again to discharge the punched sheet. If there is a subsequent sheet, the processing of steps S1 to S8 is repeated. If there is not subsequent sheet, each device is set at the home position (HP) and punching processing ends in step S9.

Figure 8:
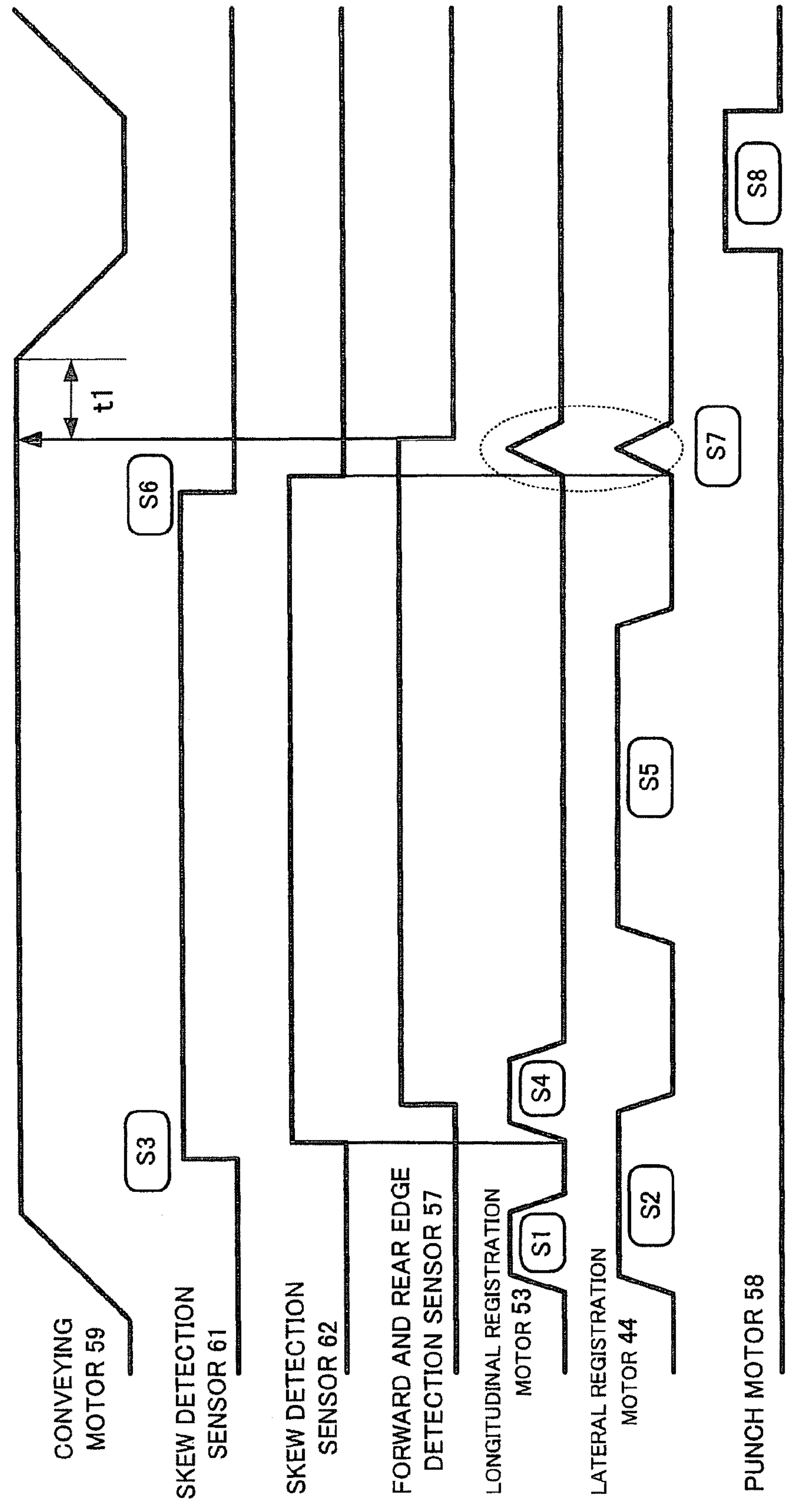
FIG. 8 is a timing chart for explaining the basic operation of the sheet processing apparatus according to the one embodiment of the invention.

FIG. 8 is a timing chart for explaining the operations according to the flowchart of FIG. 7. FIG. 8 shows the operation timing of the conveying motor 59, the sensors 61 and 62 for skew detection, the forward edge and rear edge detection sensor 57, the longitudinal registration motor 53, the lateral registration motor 44 and the punch motor 58.

S1 to S8 shown in FIG. 8 correspond to steps S1 to S8 in the flowchart of FIG. 7. Various detections and processing are executed in order from S1 to S8.

As can be seen from FIG. 8, the conveying motor 59, triggered by the detection of the rear edge of the sheet S by the sensor 57, decelerates at the point when a predetermined time period (t1) has passed. The conveying motor 59 stops rotating after that. When the conveying motor 59 has stopped, the punch motor 58 is driven to perform hole punching processing. Therefore, as this time period t1 is accurately set, the punching position on the sheet S is defined. For example, in the case where a stepping motor is used as the conveying motor 59, the number of rotations of the conveying motor 59 during the time period t1, that is, the conveying distance for the sheet S, can be kept constant by setting of the number of pulses. Thus, the punching position can be set.

Meanwhile, the punching unit 31, which carries out the above-described basic operations, may be improved in the following manner.

Specifically, as the conveying speed of the sheet S becomes higher because of higher-speed operation of the image forming apparatus 10, also the conveying motor 59 needs to be rotated at a higher speed. When the conveying motor 59 is to be stopped, the rotation speed is decelerated to stop the conveying motor.

In the example of FIG. 8, deceleration is started at the point when the predetermined time period (t1) has passed after the rear edge of the sheet S is detected by the sensor 57, and the conveying motor is thus stopped. Therefore, in the case where the conveying motor 59 is rotating at a high speed, if there is only a short time from the detection of the rear edge of the sheet S until the conveying motor 59 stops, braking does not work and the sheet S overruns the prescribed range. Therefore, the sheet S exceeds the predetermined stop position and then stops. As a result, the punching position is shifted.

If the time period (t1) from the detection of the rear edge of the sheet S until the conveying motor 59 stops is made longer, the sheet can be stopped at the accurate position even in the case where the conveying motor 59 is rotating at a high speed. However, in this case, the distance between the sensor 57 for detecting the rear edge of the sheet and the hole punching section 35 needs to be expanded, and therefore the apparatus increases in size.

Meanwhile, a technique of starting deceleration of the conveying motor 59 at the time when a predetermined time period has passed after the forward edge of the sheet S is detected, and then stopping the conveying motor 59, may be considered. However, in this case, the deceleration is carried out while the rear edge skew of the sheet S is being detected. Therefore, it becomes impossible to detect the skew at the rear edge. That is, since skew detection is based on calculation from the time difference between the detections by the sensor 61 and the sensor 62 and the conveying speed of the sheet S, the quantity of skew cannot be correctly calculated unless the speed is constant.

Figure 9:
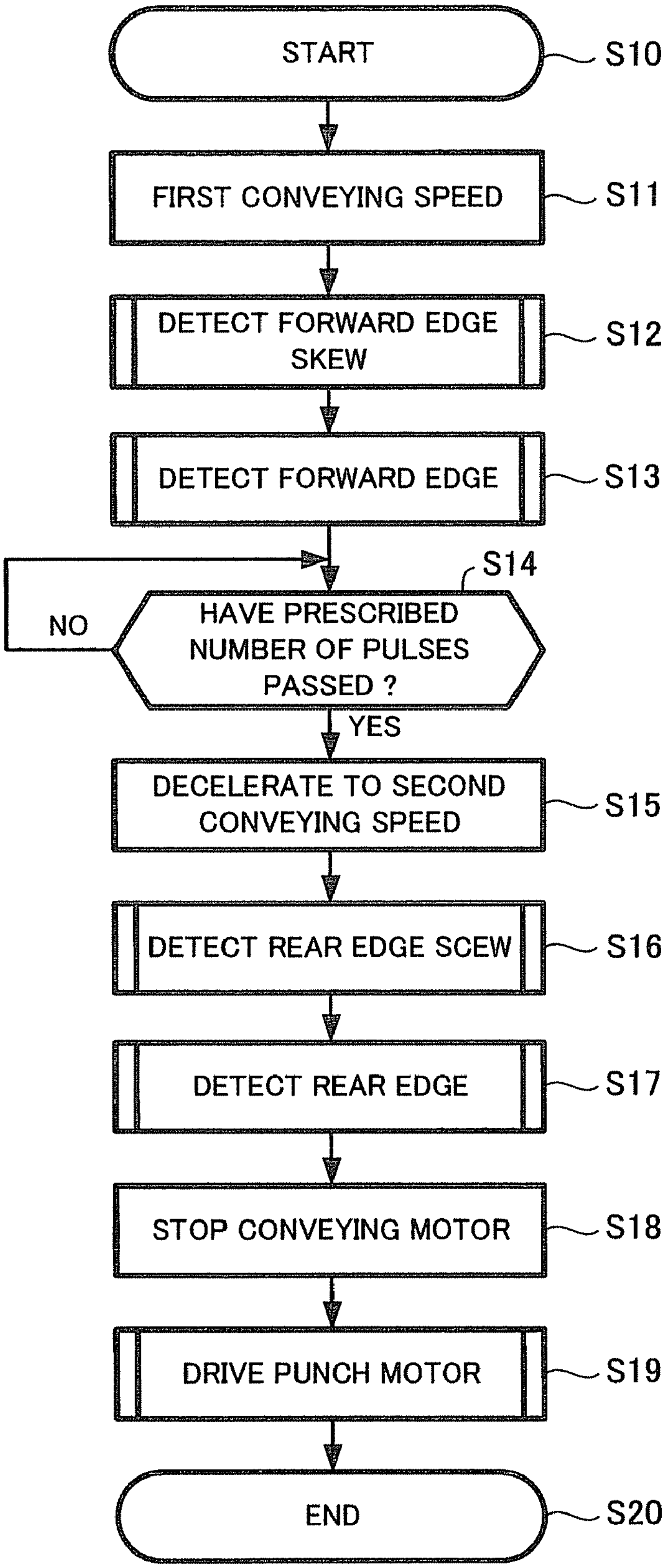
FIG. 9 is a flowchart for explaining the operation of a conveying motor of the sheet processing apparatus according to the one embodiment of the invention.

Thus, the punching mechanism 30 of the invention is characterized in that the conveying motor 59 is driven according to the control shown in the flowchart of FIG. 9.

In FIG. 9, step S10 is the step to start driving the conveying motor 59. Step S11 shows the state where the conveying motor 59 is driven at a first speed. In this state, the sheet S from the body 11 is conveyed at the first speed and the punching mechanism 30 receives the sheet S discharged from the body 11. While the sheet S is conveyed at the constant speed, the skew detection unit 60 detects the forward edge skew in step S12.

After that, as the sensor 57 detects the forward edge of the sheet S in step S13, the processing shifts to step S14. In step S14, the conveying motor 59 is pulse-driven until a predetermined number of pulses are counted after the time point when the forward edge is detected. The conveying motor 59 is then rotated at the same speed. The number of pulses counted in step S14 is prescribed by the sheet size of the conveyed sheet. For a longer sheet size, the prescribed number of pulses is set at a greater value.

As the prescribed number of pulses are counted in step S14, the conveying motor 59 is decelerated to a second speed that is lower than the first speed, in step S15. The deceleration to the second speed is completed before the rear edge of the sheet S reaches the skew detection unit 60. While the sheet S is being conveyed at the second speed, the rear edge skew of the sheet S is detected in step S16.

After that, as the rear edge of the sheet S is detected by the sensor 57 in step S17, the second-stage deceleration of the conveying motor 59 is carried out to stop the sheet S at a predetermined position, in step S18.

When the conveying motor 59 is stopped, the punch motor 58 is driven in step S19. Punching processing to the sheet S is carried out by the hole punching section 35 and punch holes are punched in the sheet S. When the hole punching processing has ended, the conveying motor 59 rotates again at the first speed to discharge the sheet S. If there is a subsequent sheet, the processing of steps S11 to S19 is repeated. If there is no subsequent sheet, the sheet conveying processing ends in step S20.

In this case, the conveying speed of the sheet S at the time of detecting the forward edge skew is the first speed, and the conveying speed of the sheet S at the time of detecting the rear edge skew is the second speed. Therefore, the control unit 70 detects the quantity of skew at the forward edge and the rear edge in consideration of the difference in the conveying speed.

Figure 10:
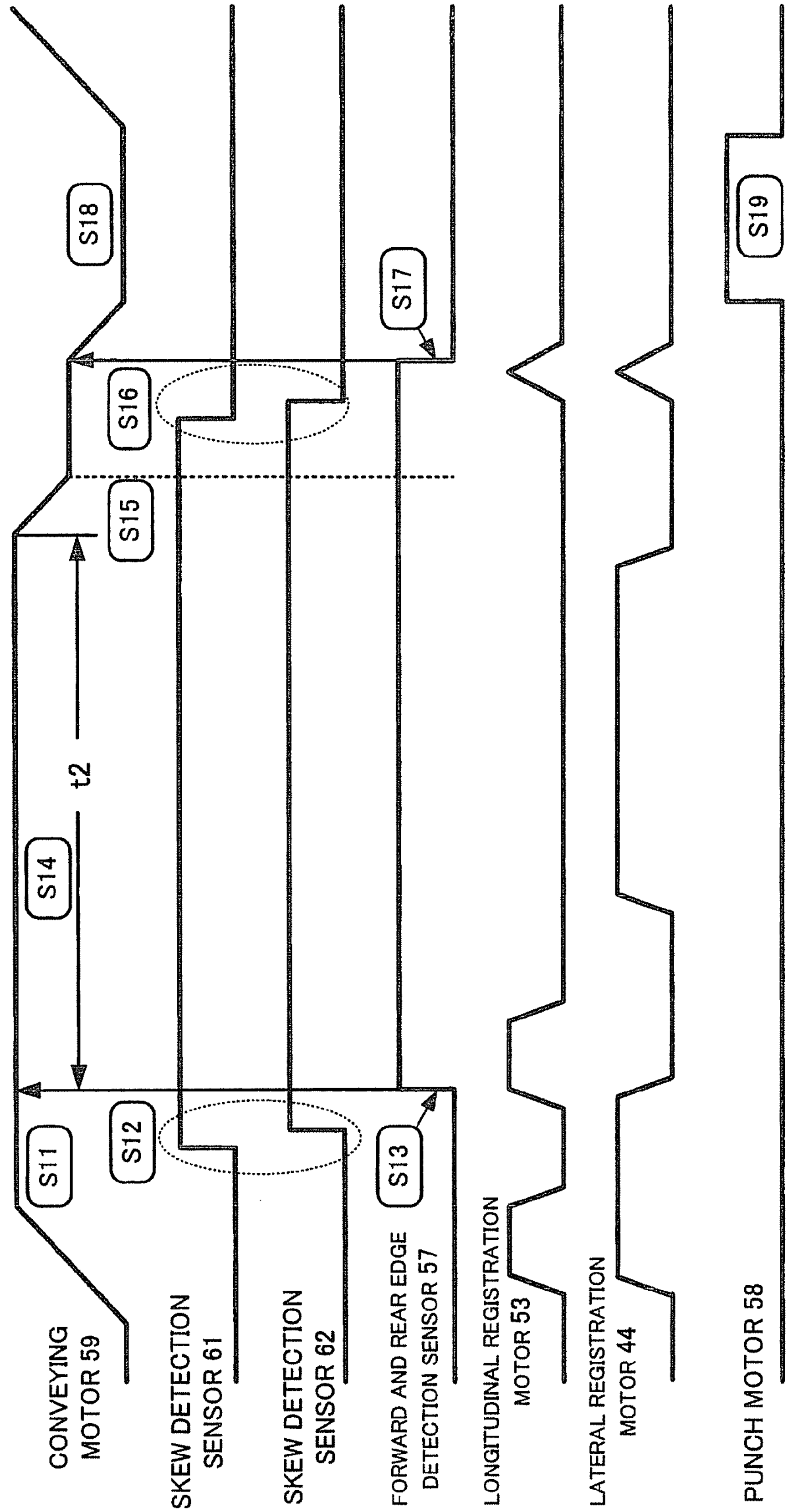
FIG. 10 is a timing chart for explaining a control operation of the sheet processing apparatus according to the one embodiment of the invention.

FIG. 10 is a timing chart for explaining the operations according to the flowchart of FIG. 9. FIG. 10 shows the operation timing of the conveying motor 59, the sensors 61 and 62 for skew detection, the forward edge and rear edge detection sensor 57, the longitudinal registration motor 53, the lateral registration motor 44 and the punch motor 58.

S11 to S19 in FIG. 10 correspond to steps S11 to S19 in the flowchart of FIG. 9. Various detections and processing are executed in order from S11 to S19.

As can be seen from FIG. 10, during the period from when the sensor 57 detects the forward edge of a sheet until it detects the rear edge, the control unit 70 performs control so that the sheet is conveyed with temporary deceleration from the first speed to the second speed and the conveying of the sheet is stopped after the sensor 57 detects the rear edge of the sheet S. Punching processing is executed when the sheet is stopped.

Also, while the conveying motor 59 is conveying the sheet S at the first speed, the sensors 61 and 62 detect the forward edge skew. The conveying motor 59, triggered by the detection of the forward edge of the sheet S by the sensor 57, starts deceleration at the point when a prescribed number of pulses have been counted (after the lapse of a time period t2), and thus decelerates to the second speed.

The timing of decelerating the conveying speed of the sheet S from the first speed to the second speed is set closely to (slightly before) the timing of detecting the rear edge of the sheet by the sensor 57. Thus, as the period during which the sheet is conveyed at the first speed is made long and the period during which the sheet is conveyed at the second speed is made short, the overall processing speed is made faster.

While the sheet S is conveyed at the second speed, the sensors 61 and 62 detect the rear edge skew. After that, the conveying motor 59 stops rotating. Then, when the conveying motor 59 is stopped, the punch motor 58 is driven to perform hole punching processing.

Therefore, since the skew detection is carried out when the conveying motor 59 is rotating at a constant speed, the quantity of skew can be accurately detected.

The conveying motor 59 temporarily decelerated to the second speed and then shifts to the stop operation. Therefore, braking can be sufficiently effective at the time of stop and the sheet S can be stopped at the accurate hole punching position. Thus, the position of the punch holes to be formed by the hole punching section 35 is not deviated.

Moreover, since the distance between the forward edge and rear edge detection sensor 57 and the hole punching section 35 need not be expanded, the apparatus can be miniaturized. As the conveying motor 59 rotates fast at the first speed most of the time, it can sufficiently deal with the high-speed operation of the image forming apparatus 10.

In this way, according to the one embodiment of the invention, the sheet can be stopped at the regular position and hole punching processing can be accurately carried out without affecting skew detection and the like and without increasing the size of the apparatus.

Meanwhile, in the basic operations of the punching unit 31 described above, the hole punching section 35 is moved in the direction of the arrow A1 by driving of the lateral registration motor 44 and is situated at the retreat position before the sheet S is conveyed therein, as shown in FIG. 6A. Then, after the sheet S is conveyed to a predetermined position, the hole punching section 35 is moved in the direction of the arrow A2, which is the opposite direction, by driving of the lateral registration motor 44 as shown in FIG. 6B. While the lateral edge of the sheet S is detected by the sensor group 56, the position of the hole punching section 35 is controlled.

However, when the image forming cycle in the image forming apparatus 10 reaches a certain speed or more, punch holes are punched in the sheet S that has already been conveyed in, and the next sheet is conveyed in before the hole punching section 35 retreats. As the image forming cycle becomes shorter, this phenomenon emerges more conspicuously.

In a certain case, a sheet is conveyed in the state of being shifted in the direction of width from the center of the conveying path, for a reason such that the user sets sheets at a wrong position in the sheet cassette 18 of the image forming apparatus 10. The shift of the sheet can be several millimeters in the positive direction and in the negative direction from the center.

Therefore, it is necessary to set the hole punching section 35 at the retreat position, considering the quantity of shift of the sheet to be conveyed therein. This causes the moving distance to the retreat position to be longer.

Thus, it takes time for the hole punching section 35 to go through the process of reciprocating movement to the retreat position and from the retreat position to the position where the lateral edge of the sheet is to be detected. The time loss in this reciprocating movement causes obstacle to higher-speed operation of the image forming apparatus 10.

Even when plural retreat positions are provided according to different sheet sizes, as in the example disclosed in JP-A-9-249348, the problem in the case where the conveyed sheet is shifted from the center cannot be solved. If the configuration having separate driving sources for the hole punching section and the lateral edge detection unit is employed, as in JP-A-2006-16129, the cost increases significantly.

Thus, the second embodiment of the invention is characterized in that the time required for the reciprocating movement of the hole punching section 35 is reduced. The movement control of the hole punching section 35 is carried out by the control unit 70.

FIG. 11A to FIG. 11D are views for explaining the operations of the punching unit 31 according to the second embodiment of the invention. The operation of skew correction will not be described.

Figure 11B:
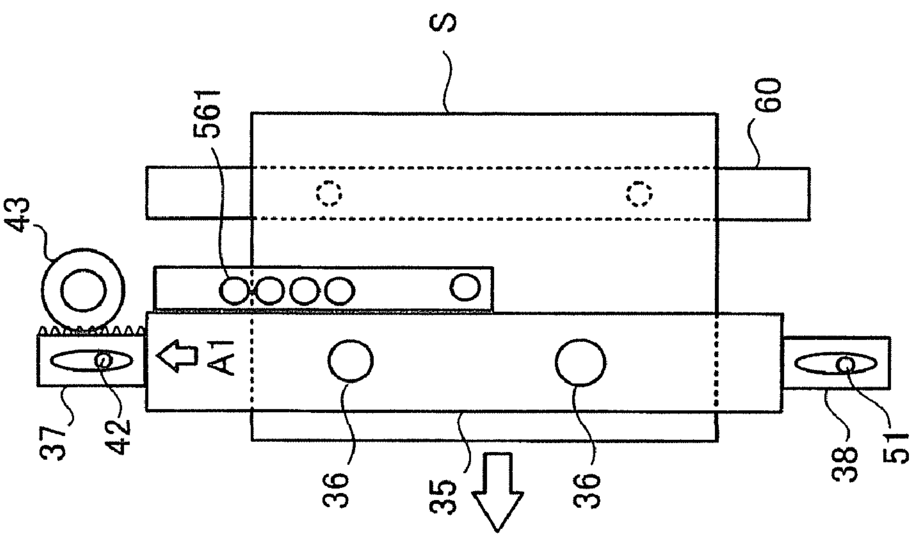
FIG. 11A to FIG. 11D are plan views for explaining the operation of a sheet processing apparatus according to a second embodiment of the invention.
Figure 11A:
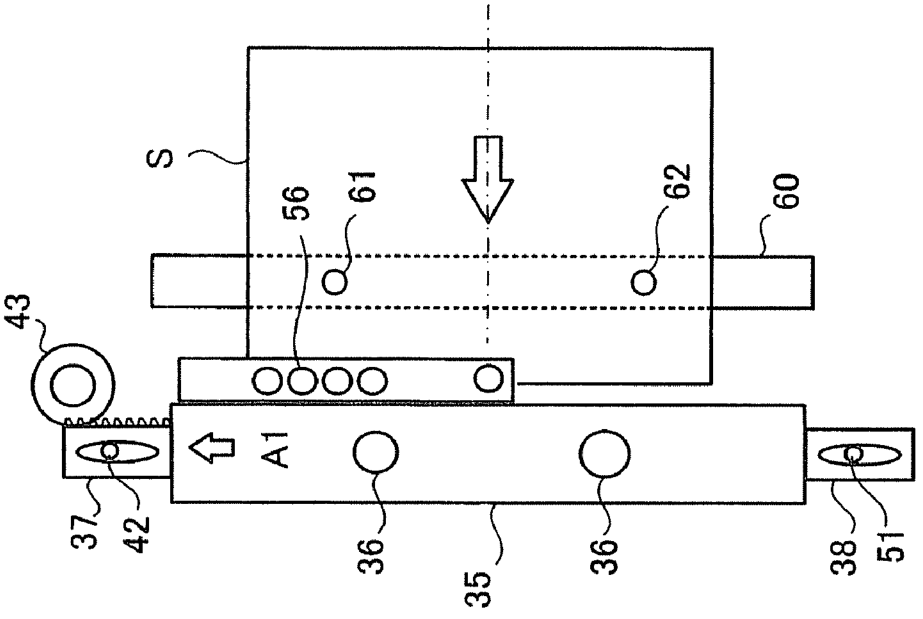

In the state shown in FIG. 11A, the hole punching section 35 is situated at a center position in the sheet conveying path or at a position where punching processing is carried out to the preceding sheet, and a sheet is conveyed thereto. In this state, the lateral registration motor 44 is driven next and the hole punching section 35 moves in the direction toward the retreat position (the direction of the arrow A1). At this time, the hole punching section 35 moves while the lateral edge of the sheet S is detected by the sensor group 56.

Figure 11D:
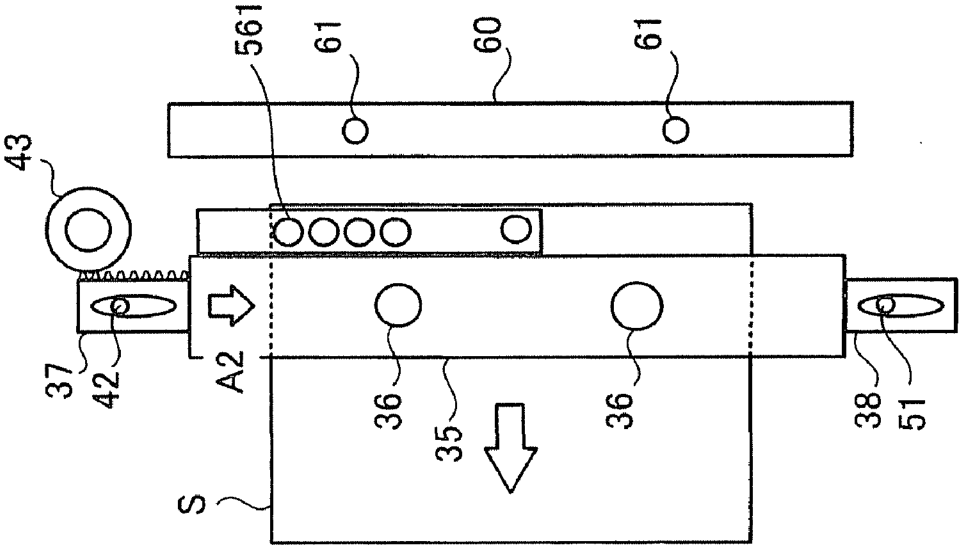
Figure 11C:
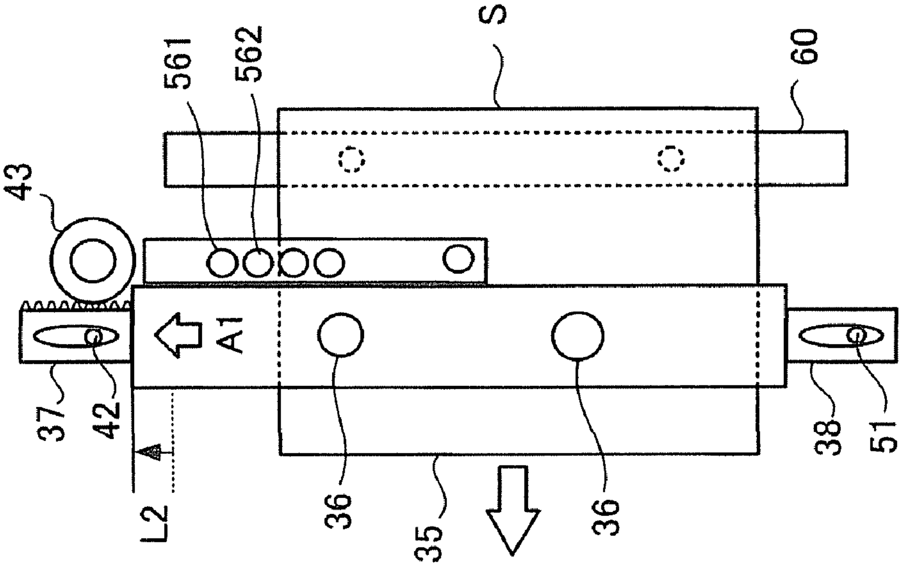

When the lateral edge of the sheet S is detected by the sensor 561 halfway through the movement in the direction of the arrow A1, as shown in FIG. 11B, the hole punching section 35 stops moving at a position which it has reached by retreating by a prescribed quantity (distance L2) from the position where the lateral edge is detected, as shown in FIG. 11C. The stop position at this time is more on the forward side than the original retreat position (see FIG. 6A). The position which the hole punching section has reached by moving in the retreat direction by the prescribed quantity (distance L2) is called standby position.

After that, the hole punching section 35 is moved again in the opposite direction (the direction of the arrow A2), as shown in FIG. 11D. The hole punching section 35 is moved up to a position where the detection output of the sensor 561 changes, and is driven to the hole punching position for punch holes.

By such operations, the quantity of movement of the hole punching section 35 can be reduced and the time required for its reciprocating movement can be reduced.

In the case where the size of the conveyed sheet S is changed, a sensor for lateral edge detection is selected form the sensor group 56 accordingly. Therefore, in this case, in moving the hole punching section 35 in the retreat direction, the hole punching section 35 can be moved by a prescribed quantity (L2) after the newly selected sensor detects the lateral edge of the sheet.

For example, if the sheet size is changed to a smaller size and the sensor 562 for lateral edge detection is selected, in moving the hole punching section 35 in the retreat direction, the hole punching section 35 is moved by a prescribed quantity (L2) after the sensor 562 detects the lateral edge of the sheet S, and then the hole punching section 35 waits at the standby position.

Figure 12:
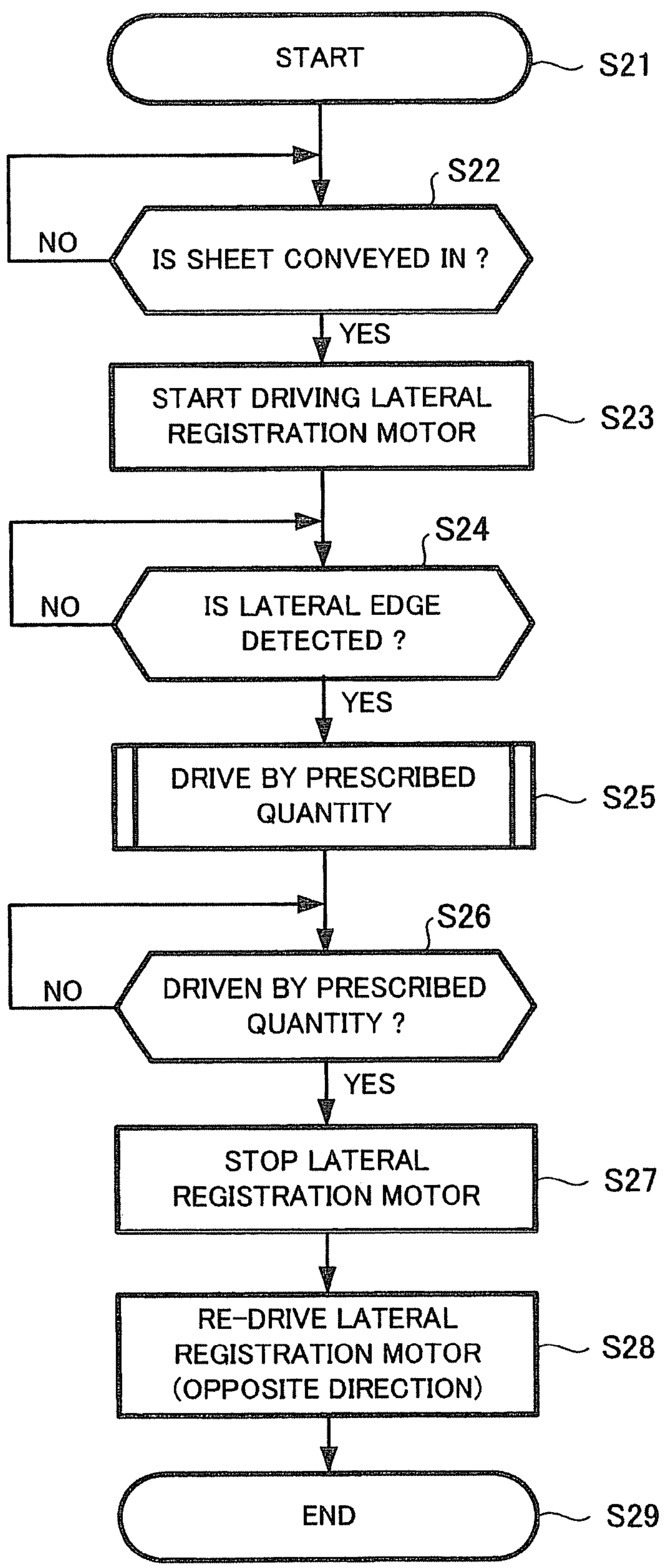
FIG. 12 is a flowchart for explaining the operation of the sheet processing apparatus according to the second embodiment of the invention.

FIG. 12 is a flowchart for explaining the above-described operation of movement control of the hole punching section 35.

In FIG. 12, in step S21, the hole punching section 35 is situated at the center position (HP) in the sheet conveying path or at a position where the previous punching processing is carried out. Step S22 is the step of confirming that the sheet S is conveyed in. As the sheet is conveyed in, the lateral registration motor 44 is driven to move the hole punching section 35 in the retreat direction, in the next step S23.

In this case, the hole punching section 35 is moved while the lateral edge is detected by the sensor group 56. As the lateral edge of the sheet S is detected in step S24, the hole punching section 35 is moved by a prescribed quantity (L2) after the time point of detecting the lateral edge, in step S25. Then, when it is detected in the next step S26 that the hole punching section 35 is moved by the prescribed quantity, driving of the lateral registration motor 44 is stopped and movement of the hole punching section 35 is stopped in step S27.

After that, in step S28, the lateral registration motor 44 is driven to move the hole punching section 35 in the opposite direction (direction A2). The hole punching section 35 is moved again to the hole punching position in accordance with the result of detection by the sensor 56 and is then stopped. If there is a subsequent sheet, the processing of steps S22 to S28 is repeated. If there is no subsequent sheet, the hole punching section is moved to the home position and the processing ends in step S29.

The original retreat position of the hole punching section 35 is the position shown in FIG. 6A. However, the standby position in the case of sequentially performing punching processing is closer to the sheet conveying path as shown in FIG. 11C and therefore the time required for the reciprocating movement of the hole punching section 35 can be reduced.

On the assumption that a sheet is shifted as it is conveyed, the sheet can be shifted by several millimeters in the positive direction and in the negative direction from the center of the conveying path. Therefore, considering the quantity of shift, it is necessary to set the original quantity of retreat at about 10 mm or more. On the other hand, the prescribed quantity of retreat L2 of the hole punching section 35 in FIG. 11C can be set at approximately 5 mm.

Thus, in the second embodiment of the invention shown in FIG. 11A to FIG. 11D, the quantity of reciprocating movement of the hole punching section 35 can be halved. Naturally, the time for punching processing, power consumption and the like can be reduced as well.

In the case where a stepping motor is used as the lateral registration motor 44, the number of rotations of the lateral registration motor 44, that is, the moving distance of the hole punching section 35, can be controlled according to the setting of the number of pulses. Therefore, the number of pulses for movement of the hole punching section 35 can be significantly reduced.

Next, a modification of the second embodiment of the invention will be described with reference to FIG. 13A and FIG. 13B.

In this modification, movement control of the hole punching section 35 is carried out, using the detection results of a sensor used for detection of the sheet size and the other sensors, of the sensor group 56. The movement control is carried out by the control unit 70.

Figure 13B:
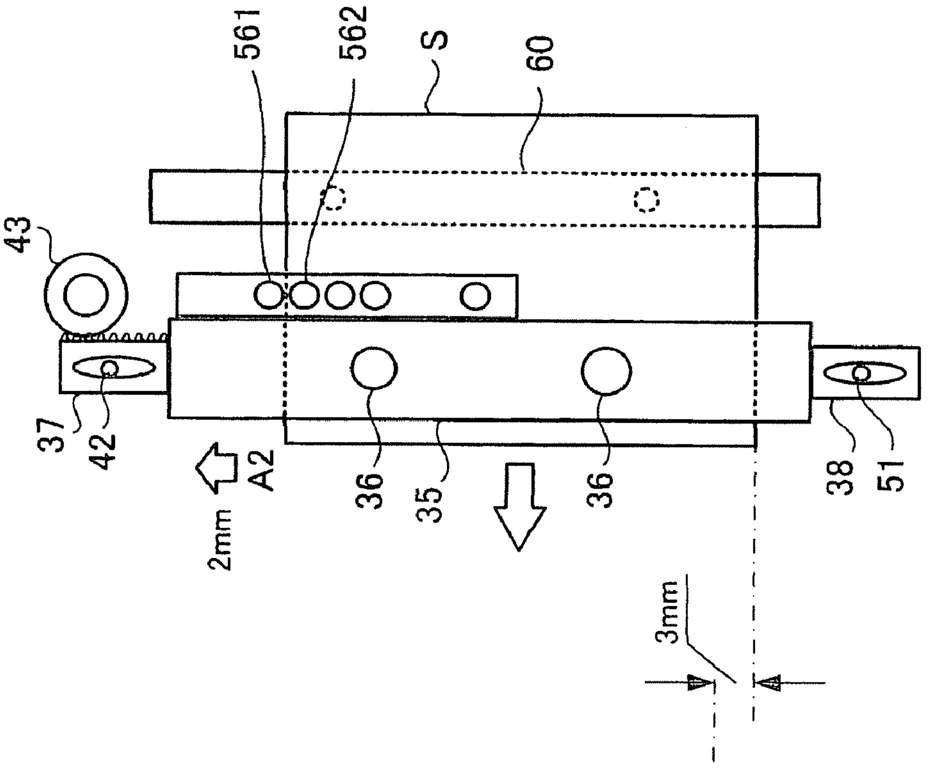
FIG. 13A and FIG. 13B are plan views for explaining a modification of the sheet processing apparatus according to the second embodiment of the invention.
Figure 13A:
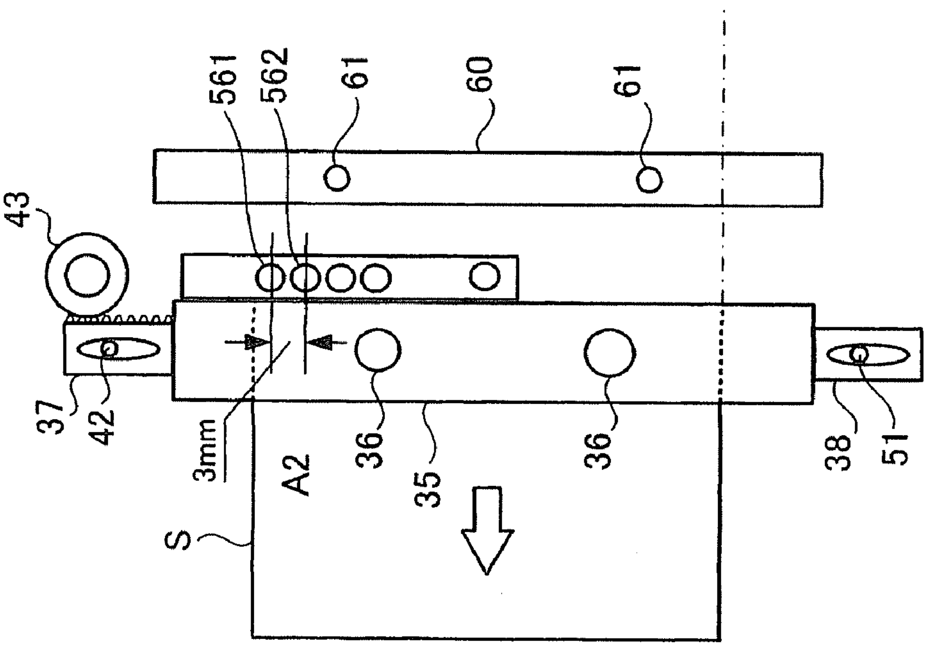

For example, it is assumed that the interval between the sensors of the sensor group 56 is 3 mm each, as shown in FIG. 13A. It is also assumed that the prescribed quantity of retreat L2 of the hole punching section 35 is set at 5 mm.

FIG. 13A shows the state where a punched sheet S is about to be discharged from the hole punching section 35. Then, it is assumed that the next sheet is conveyed in with a shift of approximately 3 mm forward (downward in FIG. 13B) compared with the previous sheet, as shown in FIG. 13B. It is also assumed that the sensor 561 of the sensor group 56 is to detect the original sheet size.

When the sheet S is conveyed with a downward shift, as shown in FIG. 13B, the lateral edge detection sensor 561 is not shielded by the sheet and has already detected light. In this state, the hole punching section 35 moves in the direction of the arrow A2 in order to retreat to the retreat position. Therefore, the next sensor 562 which is arranged 3 mm inner than the sensor 561 detects the lateral edge of the sheet S.

Thus, the hole punching section 35 is controlled to retreat by 2 mm from there at the time point when the sensor 562 detects the lateral edge. That is, in this case, since the sheet S is already shifted by 3 mm in the opposite direction to the retreat direction of the hole punching section 35, the hole punching section 35 can retreat to the position which is shifted by 5 mm relatively to the sheet S, simply by retreating by 2 mm. Thus, the hole punching section 35 only needs to move 2 mm, instead of the original distance of 5 mm.

Figure 14B:
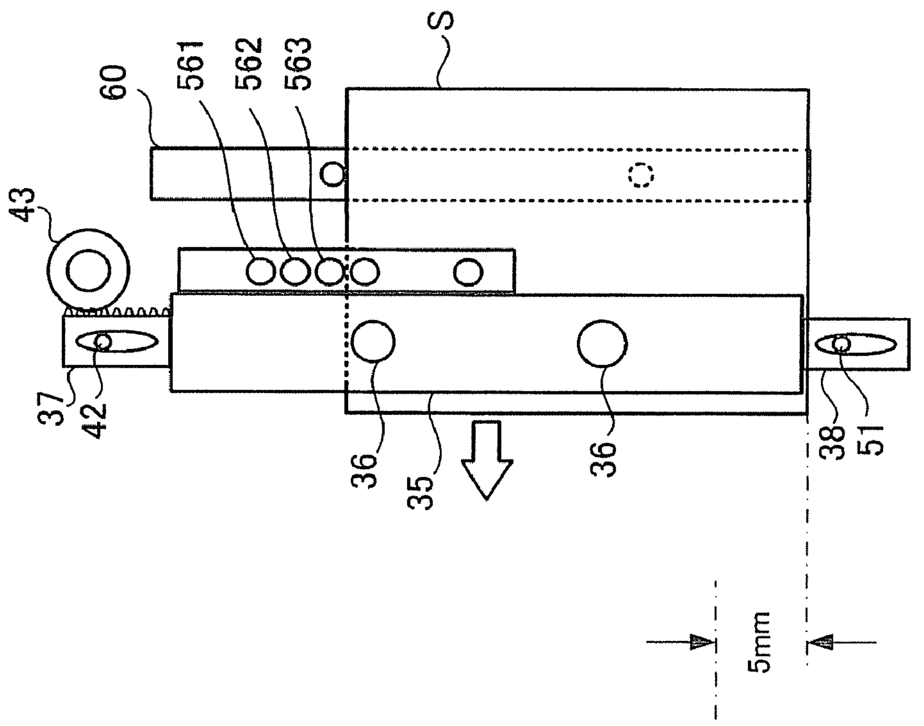
FIG. 14A and FIG. 14B are plan views for explaining another modification of the sheet processing apparatus according to the second embodiment of the invention.
Figure 14A:
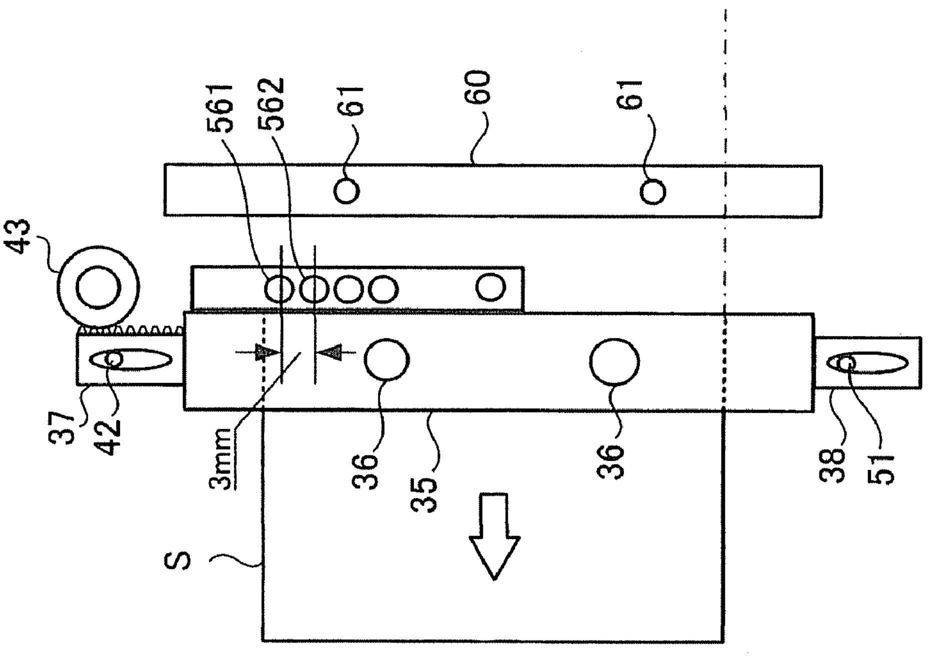

FIG. 14A and FIG. 14B show the case where the sheet S is shifted further as it is conveyed in.

FIG. 14A shows the state where the punched sheet S is about to be discharged from the hole punching section 35. Then, it is assumed that the next sheet is conveyed in with a shift of approximately 5 mm forward (downward in FIG. 14B) compared with the previous sheet, as shown in FIG. 14B.

In the state of FIG. 14B, in addition to the lateral edge detection sensor 561, the next sensor 562 and the sensor 563 have already detected the lateral edge of the sheet. That is, not only the lateral edge detection sensor 561 but also the sensor 563 which is arranged 5 mm or further inner than the sensor 561 has already detected light.

Thus, the hole punching section 35 is controlled to keep its position without moving in the retreat direction when the sensor 563 has detected the lateral edge. That is, in this case, since the sheet S is already shifted by 5 mm in the opposite direction to the retreat direction of the hole punching section 35, the hole punching section 35 does not have to retreat. Thus, the hole punching section 35 does not have to move, instead of moving by the prescribed distance of 5 mm.

In this way, in the above-described modifications, the program is set to control the movement of the hole punching section 35, using the detection results not only of the original lateral edge detection sensor but also of the other sensors linked to the former sensor. Thus, in moving the hole punching section 35 in the retreat direction, as the quantity of movement is controlled in accordance with the number of sensors that have already detected light, of the sensor group 56, the quantity of reciprocating movement can be reduced further. Moreover, the time for punching processing, power consumption and the like can be reduced as well.

In this way, according to the second embodiment of the invention, the quantity of movement of the hole punching section 35 in the lateral direction at the time of punching processing can be reduced to realize high-speed processing. Also, even when a sheet is shifted in the lateral direction as it is conveyed, punch holes can be formed at prescribed positions.

Next, a sheet processing apparatus according to the third embodiment of the invention will be described. In the third embodiment, the technique of skew correction is improved, which will be described with reference to FIG. 15, FIG. 16A and FIG. 16B.

Skew correction is carried out by rotation control of the hole punching section 35. As shown in FIG. 4, the longitudinal registration motor 53 is rotated in accordance with the quantity of skew detected by the skew detection unit 60, then the gear group 52 and the cam 47 are rotated, and the hole punching section 35 is turned by the rotation of the lever 49. The longitudinal registration motor 53 is pulse-driven and is controlled to tilt the hole punching section 35 in the positive direction and the negative direction from the center position.

Figure 15:
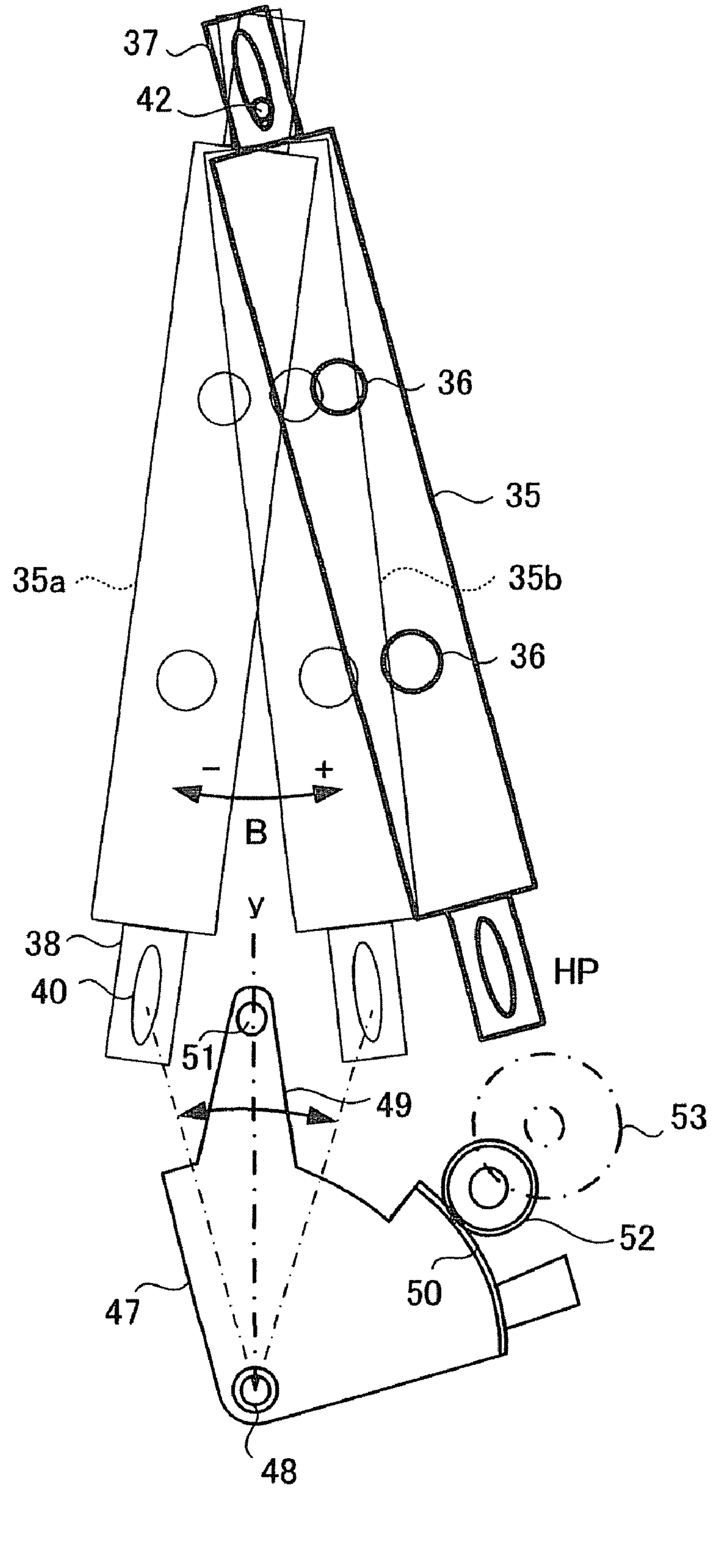
FIG. 15 is a plan view for explaining the operation of skew correction in a sheet processing apparatus according to a third embodiment of the invention.

As shown in FIG. 15, the hole punching section 35 at its home position (HP) is situated as indicated by the bold line. Meanwhile, at the time of skew correction, the hole punching section 35 is turned and tilted within the range indicated by the thin solid lines 35*a* and 35*b*, by the rotation of the longitudinal registration motor 53. The quantity of turning changes in accordance with the quantity of skew detected by the skew detection unit 60.

In the case of carrying out skew correction based on the detection of the forward edge skew, the longitudinal registration motor 53 can be driven, for example, by 12 pulses in the positive direction and 12 pulses in the negative direction from the center position (indicated by the chain-dotted line y). That is, the longitudinal registration motor 53 can be driven by 24 pulses at the maximum.

Meanwhile, as a skew correction range based on the detection of the rear edge skew, the longitudinal registration motor 53 can be driven, for example, by six pulses in the positive direction and six pulses in the negative direction in consideration of the processing time. That is, the longitudinal registration motor 53 can be driven by 12 pulses at the maximum. Therefore, the cam 47 turns within a predetermined angular range that is symmetrical about the position (y) where the hole punching section 35 is orthogonal to the conveying path. If the skew correction range at the forward edge is expressed by w1 and the skew correction range at the rear edge is expressed by w2, the following relation is set.

$$w1>w2\geqq w1/2$$

Figure 16A:
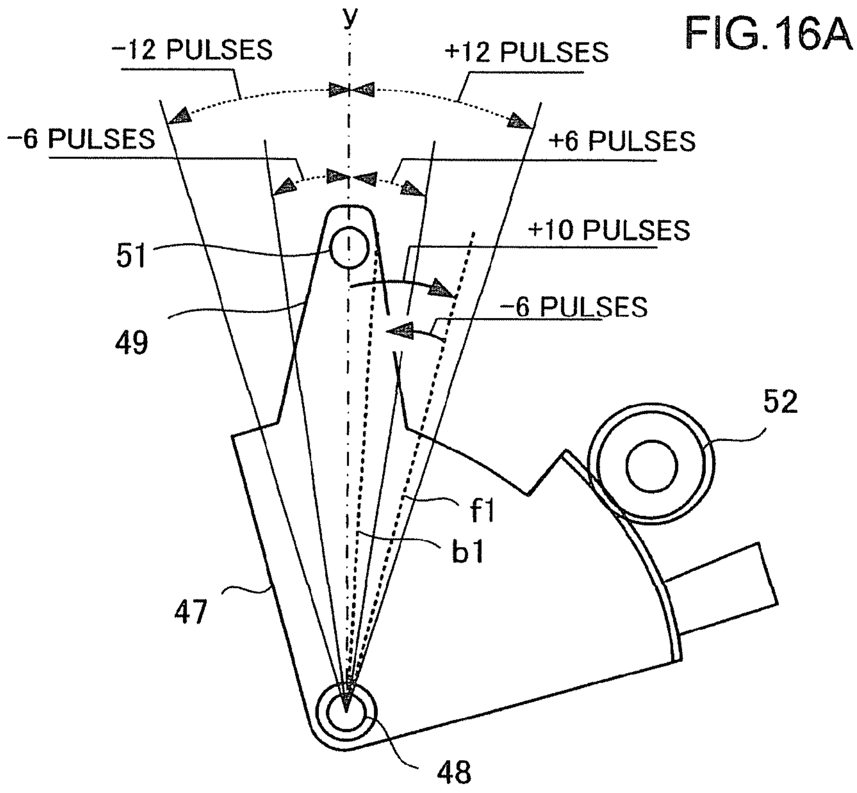
FIG. 16A and FIG. 16B are explanatory views for explaining a specific operation of skew correction in the sheet processing apparatus according to the third embodiment of the invention.

Meanwhile, in such driving setting, it may be impossible to deal with a large quantity of skew correction. For example, a case will now be described in which the quantity of skew detected at the forward edge of the sheet is equivalent to +10 pulses as indicated by the dotted line f1 and the quantity of skew detected at the rear edge of the sheet is equivalent to +2 pulses as indicated by the dotted line b1, as shown in FIG. 16A. In this case, the longitudinal registration motor 53 is rotated by 10 pulses in the positive direction in accordance with the skew correction at the forward edge.

On the other hand, for skew correction at the rear edge, correction by ±6 pulses is possible. However, since the longitudinal registration motor 53 is driven by 10 pulses in the positive direction by skew correction at the forward edge, the range in which the longitudinal registration motor 53 can be driven at the time of rear edge skew detection is two pulses, that is, from 10 pulses to 12 pulses in the positive direction. In the negative direction, the longitudinal registration motor 53 can only be driven by six pulses (up to the position of +4 pulses) from 10 pulses. Therefore, the driving range according to the rear edge skew is a total of eight pulses and the operation range is narrowed by four pulses. If the quantity of skew b1 at the rear edge is equivalent to +2 pulses, correction is insufficient.

Thus, in the third embodiment of the invention, another measure is taken in the technique of skew correction. Specifically, the invention is characterized in that, in the case where the quantity of skew at the forward edge exceeds the skew correction range w2 (±6 pulses) at the rear edge, skew correction at the forward edge is carried out by the amount equivalent to the skew correction range w2 (±6 pulses) at the rear edge, and the insufficient correction is compensated for by skew correction at the rear edge.

For example, when the quantity of skew correction at the forward edge is equivalent to a prescribed number of pulses (for example, ±6 pulses) or less, the hole punching section 35 is turned in proportion to the quantity of skew at the forward edge. On the other hand, when the quantity of skew correction at the forward edge exceeds the prescribed number of pulses (for example, ±6 pulses) the way of controlling the turning varies.

The operation in the case where the quantity of skew at the forward edge is larger than the prescribed value will be described with reference to FIG. 16B. Specifically, the skew detection unit 60 carries out skew detection and it is first determined whether the quantity of skew correction at the forward edge is the prescribed number of pulses or more (in this example, six pulses or more).

Then, if the quantity of skew correction at the forward edge (indicated by the dotted line f1) exceeds the prescribed number of pulses (for example, if it is equivalent to +10 pulses), the longitudinal registration motor 53 is driven by the prescribed number of pulses (six pulses) in the positive direction. After that, skew correction at the rear edge is carried out.

In the skew correction at the rear edge, correction is made by the difference between the quantity of skew at the forward edge after correction and the quantity of skew at the rear edge. For example, if the quantity of skew at the rear edge (indicated by the dotted line b1) is equivalent to +2 pulses, the longitudinal registration motor 53 is situated at the position of +6 pulses after the skew correction at the forward edge. Therefore, the longitudinal registration motor 53 is driven in the negative direction by four pulses equivalent to the difference. Thus, it is possible to correct the position to the regular position of +2 pulses.

In the example shown in FIG. 16A, the longitudinal registration motor 53 is driven to +10 pulses in the forward edge skew correction and can only be driven by six pulses in the negative direction in the rear edge skew correction. Therefore, the longitudinal registration motor 53 must be stopped at the position of +4 pulses. On the other hand, with the control shown in FIG. 16B, the hole punching section can be corrected to the regular position of +2 pulses.

Figure 16B:
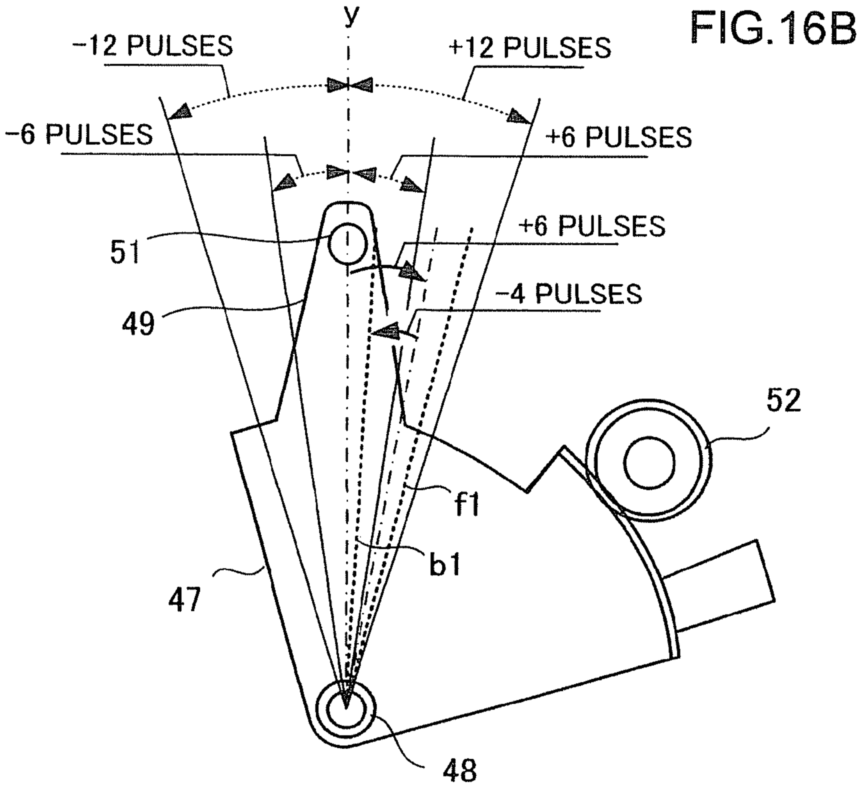

Also, in the example of FIG. 16B, since the position is corrected from the center y to the position of +6 pulses by the skew correction at the forward edge, in consideration of this position as a reference, correction by six pulses to the +12 pulses in the positive direction can be made in the skew correction at the rear edge. In the negative direction, correction by six pulses to the center position can be made. That is, driving by a total of 12 pulses is possible. Therefore, skew correction can be effectively made within the skew correction range at the rear edge.

Figure 17:
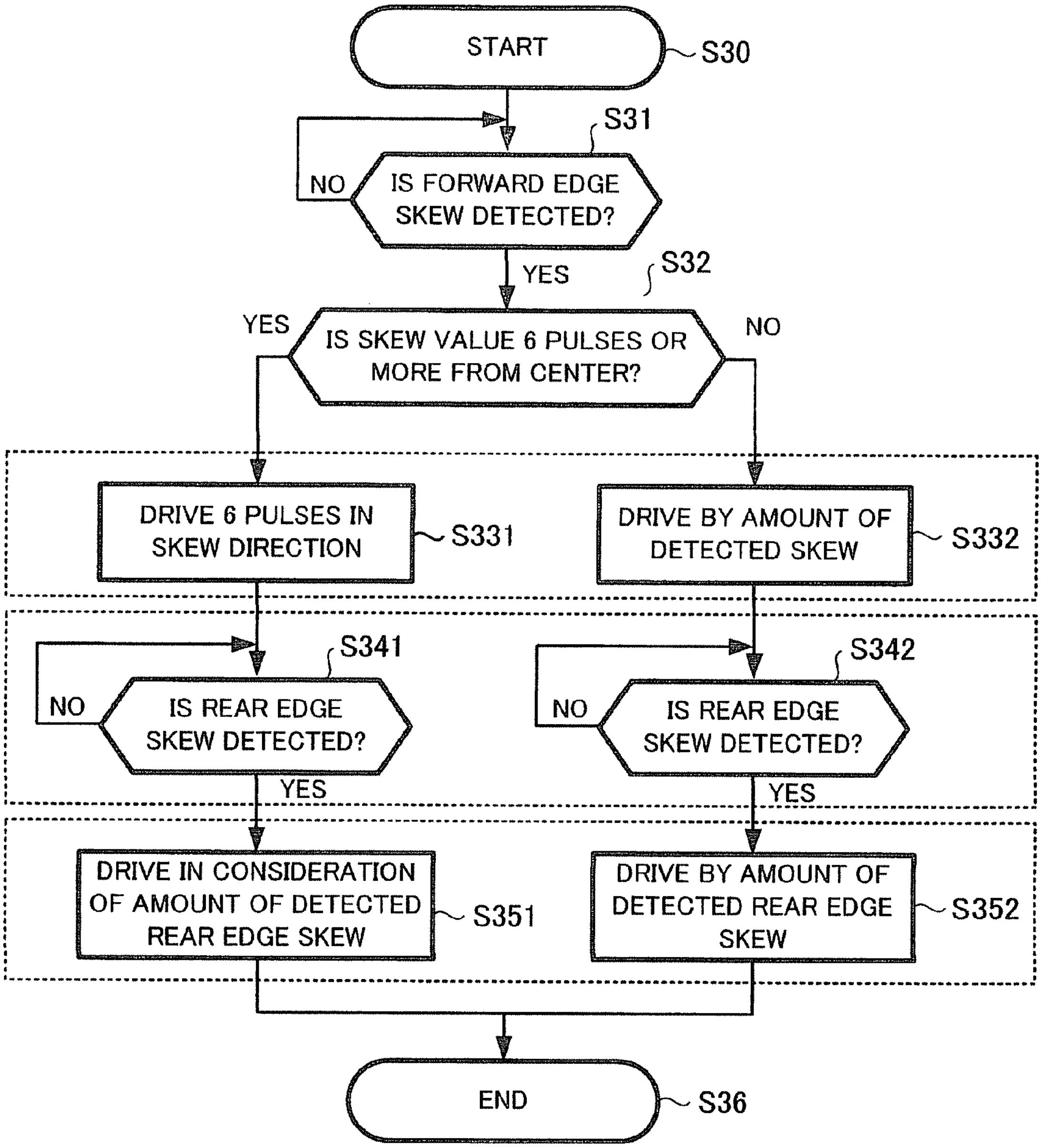
FIG. 17 is a flowchart for explaining the operation of skew correction in the sheet processing apparatus according to the third embodiment of the invention.

FIG. 17 is a flowchart for explaining the above-described operation of skew correction.

In FIG. 17, step S30 is the step of starting skew correction. In step S31, the skew detection unit 60 detects the quantity of skew at the forward edge of the sheet S. In the next step S32, it is determined whether the quantity of skew correction at the forward edge is six pulses (a prescribed number of pulses) or more from the center.

For example, if the quantity of skew correction is 10 pulses, the processing shifts to step S331. To correct the forward edge skew, the longitudinal registration motor 53 is driven by six pulses and the hole punching section 35 is thus turned. After that, in step S341, the quantity of skew at the rear edge of the sheet S is detected.

If the result of skew detection at the rear edge shows, for example, the position of +2 pulses, the longitudinal registration motor 53 is driven by four pulses in the negative direction corresponding to the difference from the current position in consideration of the quantity of skew at the rear edge, in step S351. Thus, the hole punching section 35 can be turned to the regular position of +2 pulses.

Meanwhile, if the quantity of skew correction is less than six pulses in step S32, the processing shifts to step S332. To carry out skew correction at the forward edge, the longitudinal registration motor 53 is driven by the number of pulses equivalent to the quantity of skew and the hole punching section 35 is thus turned and tilted.

After that, in step S342, the quantity of skew at the rear edge of the sheet S is detected. If the result of skew detection at the rear edge shows, for example, the position of +2 pulses, the longitudinal registration motor 53 is rotated by +2 pulses, which are equivalent to the quantity of skew at the rear edge, in step S352. Thus, the hole punching section 35 can be turned to the regular position of +2 pulses. Step S36 is the step of ending skew correction.

In this way, in the third embodiment of the invention, since the hole punching section 35 can be rotationally controlled within the prescribed range in the positive direction and in the negative direction at the time of skew correction at the rear edge, the driving range according to the rear edge skew correction is not narrowed. Therefore, skew correction can be accurately made. Moreover, the time for skew correction can be reduced.

Figure 18A:
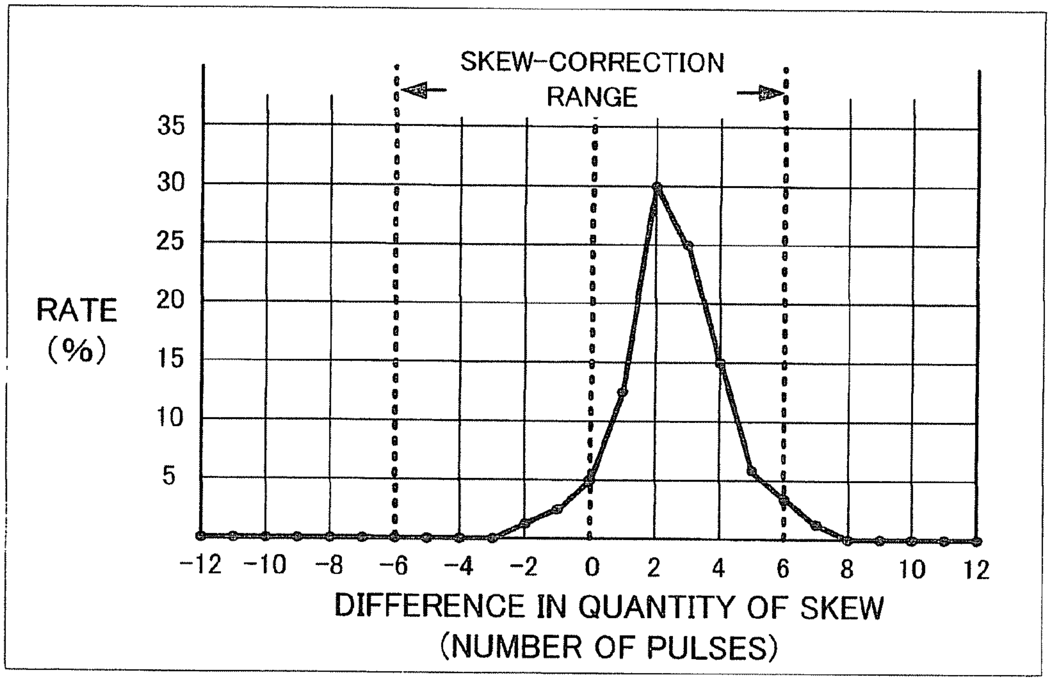
FIG. 18A and FIG. 18B are graphs for explaining characteristics of skew correction in the sheet processing apparatus according to the third embodiment of the invention.
Figure 18B:
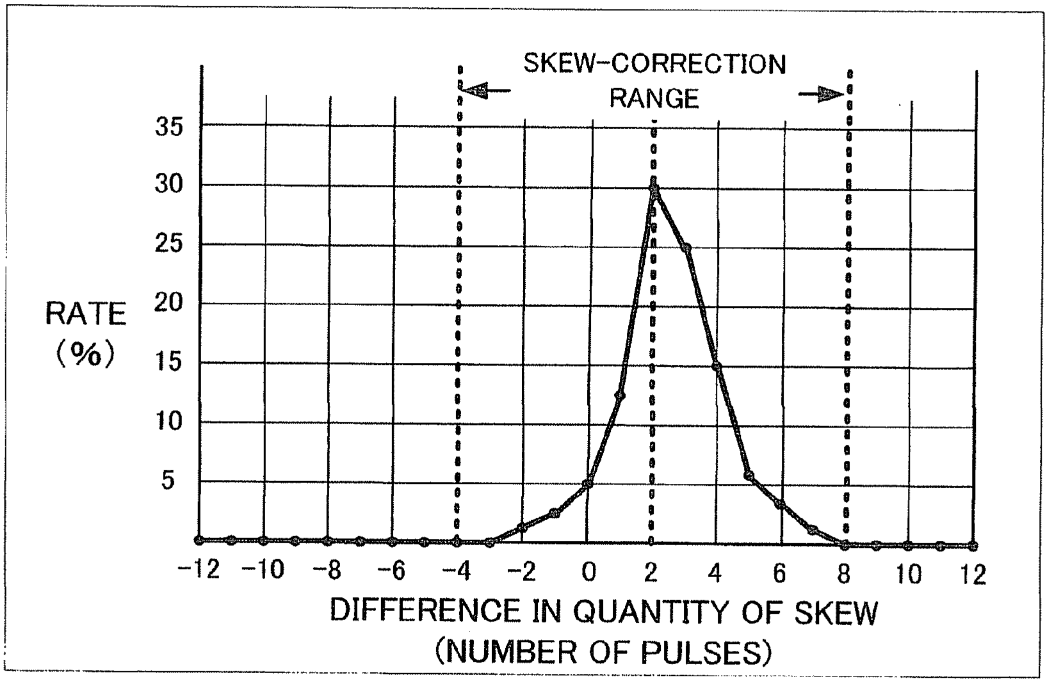

FIG. 18A and FIG. 18B are graphs for explaining a modification of the skew correction in the third embodiment of the invention.

In this modification, the quantity of skew detected at the forward edge of the sheet and the quantity of skew detected at the rear edge of the sheet are measured for each sheet size, at each sheet conveying speed, and so on. Then, statistics of the difference in the quantity of skew between the forward edge and the rear edge are taken and the technique of skew correction is automatically or manually switched.

For example, in the case where the quantity of skew at the rear edge tends to be two pulses or more in the positive direction with respect to the quantity of skew at the forward edge, as shown in FIG. 18A, the hole punching section 35 is controlled to be tilted at an angle corrected by +2 pulses from the position of forward edge skew correction. Thus, at the time of skew correction at the rear edge, the tilt of the hole punching section 35 has already been corrected by the amount equivalent to the difference calculated in the statistics and therefore the driving time required for skew correction at the rear edge can be reduced.

That is, in the characteristics shown in FIG. 18A, the skew-correctable range is from +6 pulses to −6 pulses, whereas the different between the actual quantities of skew is shifted in the positive direction and causes imbalance. Therefore, skew correction at the rear edge takes time.

On the other hand, in the case where correction by +2 pulses is made in advance, the skew-correctable range is from +8 pulses to −4 pulses with the point of +2 located at its center, as shown in FIG. 18B, and well-balanced correction can be made with respect to the center point of +2. Thus, the time for skew correction at the rear edge can be reduced.

According to such a modification, even when the quantity of skew differs largely between the forward edge and the rear edge of the sheet, the hole punching section 35 can be effectively turned within the allowable range by skew correction at the rear edge, and accurate skew correction can be made. Also, the time for skew correction can be reduced.

In the above-described example, the state of the sheet is detected by various sensors. For example, plural sensors are used to detect the state of skew of the sheet S, the position of the edge in the direction of width (lateral edge), the positions of the forward and rear edges and so on.

However, if a greater number of sensors are used, the space for attacking these sensors is required and the punching unit itself becomes larger. Moreover, if the number of sensors increases, the possibility of detection errors increases accordingly and power consumption increases as well.

Thus, in the fourth embodiment of the invention, an improvement is made so that the forward and rear edges of the sheet S are detected by using the sensors 61 and 62 of the skew detection unit 60, and the forward edge and rear edge detection sensor 57 of FIG. 2 is omitted.

Hereinafter, a sheet processing apparatus according to the fourth embodiment of the invention will be described with reference to FIG. 19.

Figure 19:
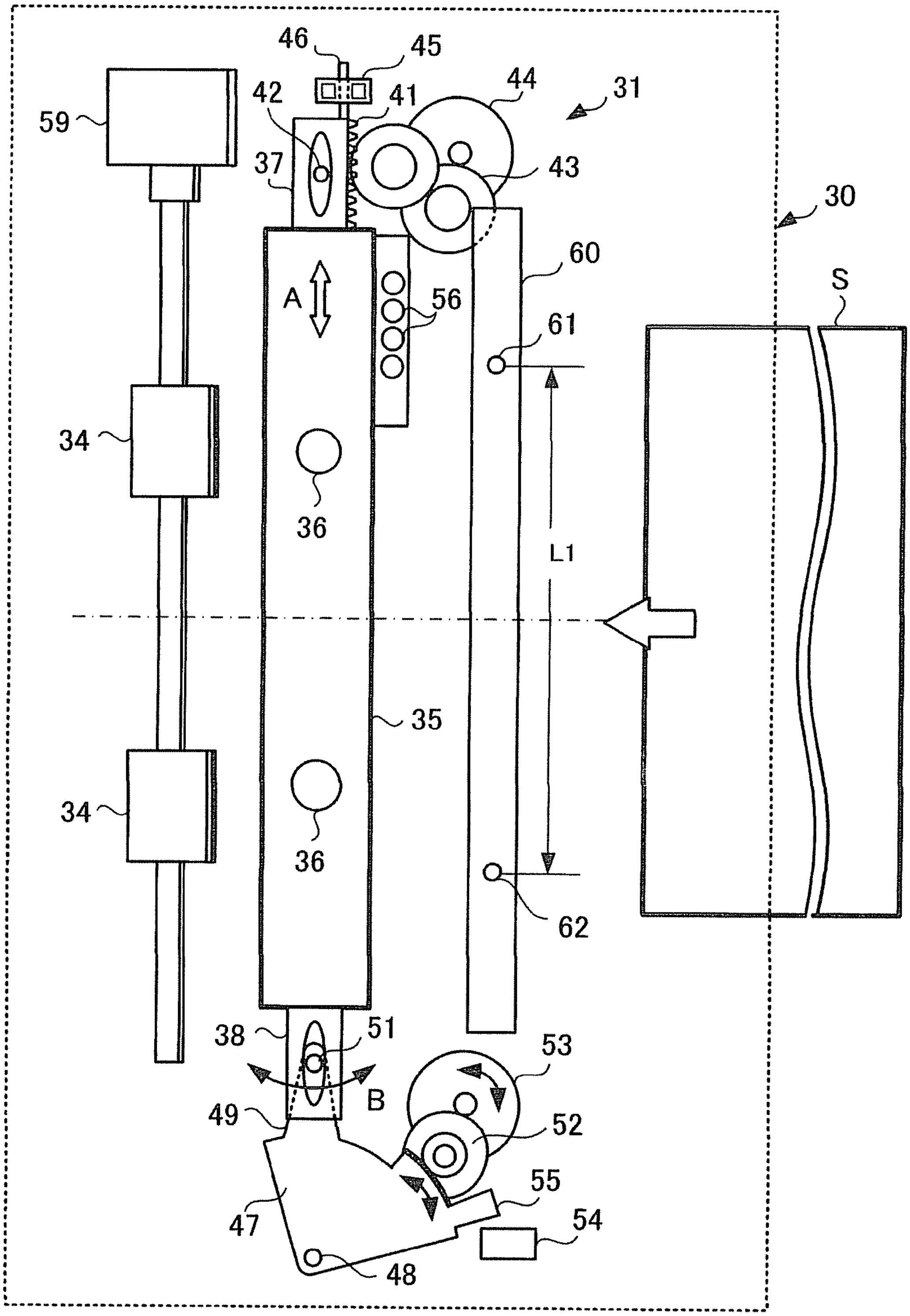
FIG. 19 is a plan view showing the configuration of a sheet processing apparatus according to a fourth embodiment of the invention.

In FIG. 19, a punching mechanism 30 has a punching unit 31. The punching unit 31 has the function of performing punching processing to the sheet S and correcting skew of the sheet S. The punching unit 31 has a hole punching section 35 which punches punch holes in the sheet S conveyed therein from the image forming apparatus 10, and a skew detection unit 60 for detecting skew.

The configuration of the hole punching section 35 is the same as the configuration shown in FIG. 2 and therefore will not be described further in detail. To control movement of the hole punching section 35 in the direction (the direction of the arrow A) orthogonal to the conveying direction of the sheet S, a gear group 43 which rotates by meshing with a rack 41, and a lateral registration motor 44 for rotating this-gear group 43 are provided.

Moreover, to turn the hole punching section 35 in the longitudinal direction (direction B), a cam 47, a gear group 52, and a longitudinal registration motor 53 for rotating the gear group 52 are provided.

On the side of the hole punching section 35 where the sheet S is conveyed in, a sensor group 56 for detecting the edge in the lateral direction (lateral edge) of the sheet S is provided. Meanwhile, sensors 61 and 62 which detect skew and also detect the forward and rear edges of the sheet S are provided in the skew detection unit 60. In these sensors 61 and 62, for example, a light emitting device and a light receiving device are arranged to face each other, and when the sheet S is conveyed and travels between the light emitting device and the light receiving device, these sensors detect the passage of the sheet.

The sensor 61 and the sensor 62 are situated on the inner side than the minimum width dimension of the sheet S, as shown in FIG. 19. These sensors are symmetrically provided at positions that are away from each other by a predetermined distance L1 and at an equal distance from the center of the sheet conveying path.

Detection signals from the sensors 61 and 62 are sent to a control unit 70 shown in FIG. 21, which will be described later. If there is a time difference when the sensors 61 and 62 have detected the passage of the sheet S, the control unit 70 detects the quantity of skew of the sheet S on the basis of the time difference. The control unit 70 also has the function of calculating position information of the forward edge and the rear edge of the sheet S in accordance with the result of detection by the sensors 61 and 62.

That is, the sensors 61 and 62 form a first detection unit, which is used for skew detection and detection of the forward and rear edges of the sheet S. Therefore, the forward edge and rear edge sensor 57 shown in FIG. 2 is not provided. The sensor group 56 forms a second detection unit which detects the edge in the lateral direction (lateral edge) of the sheet S.

Next, the operation of the punching unit 31 of FIG. 19 will be described with reference to FIG. 20A and FIG. 20B.

Figure 20B:
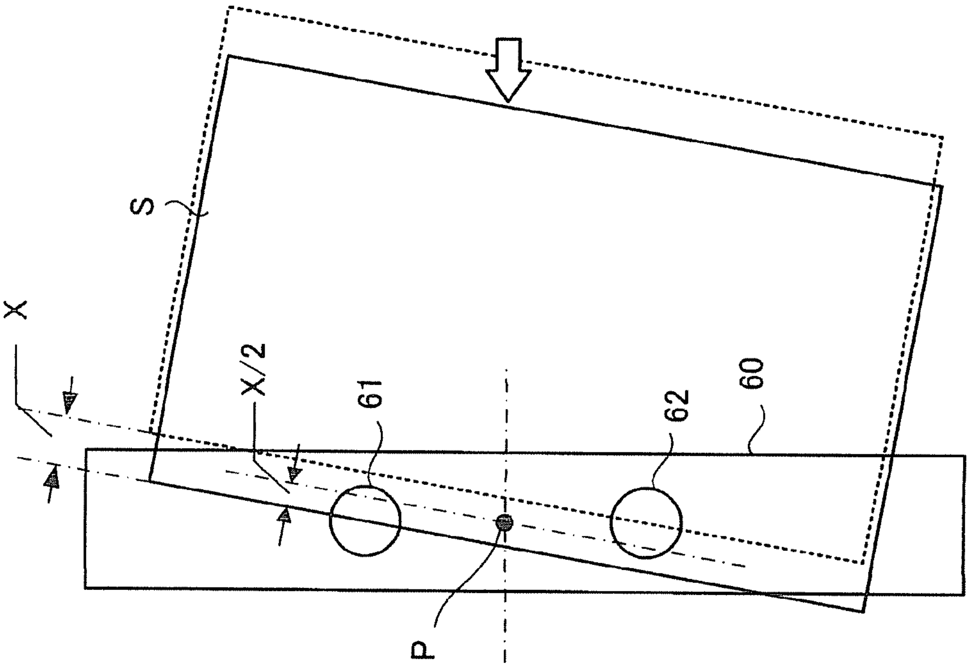
FIG. 20A and FIG. 20B are plan views for explaining the operation to calculate the forward edge and rear edge of a sheet in the sheet processing apparatus according to the fourth embodiment of the invention.
Figure 20A:
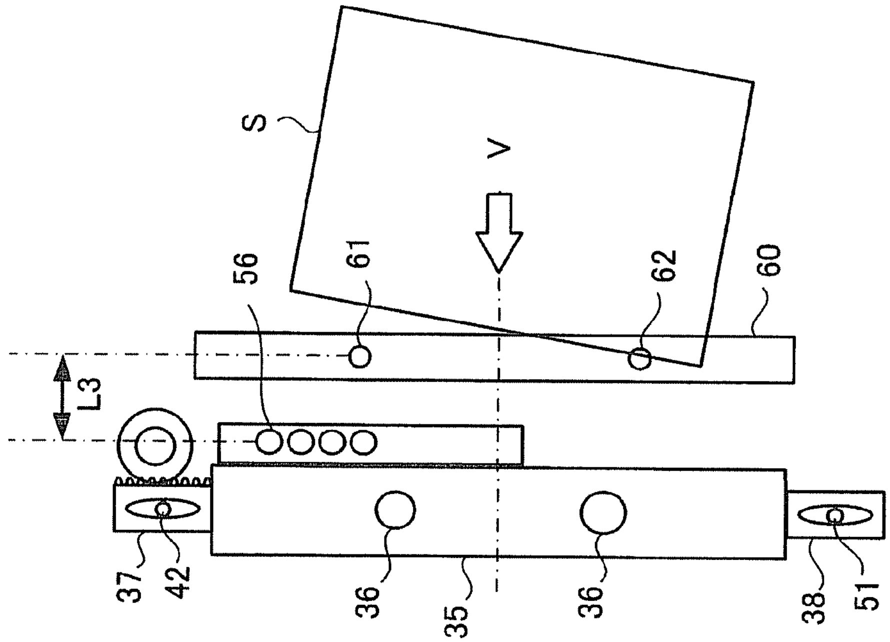

It is assumed that the skewed sheet S is conveyed in, as shown in FIG. 20A. This example shows the state where the sheet is skewed at such an angle that the sensor 62 detects the sheets before the sensor 61. FIG. 20B is an enlarged view of the part including the sensors 61 and 62 for explanation of the operation.

In the case of FIG. 20B, the skew detection sensor 62 first detects the forward edge of the sheet S (indicated by the dotted line) that is conveyed in, and the other skew detection sensor 61 detects the forward edge of the sheet S (indicated by the solid line) shortly after. The time difference in this case is expressed by X. The quantity of skew is detected from this time difference X.

If the intermediate point between the sensors 61 and 62 is P, the time after the lapse of X/2 hours from the detection of the forward edge of the sheet by the skew detection sensor 62 is the timing when the center of the forward edge of the sheet S passes the intermediate point P.

Thus, if the distance between the skew detection unit 60 and the hole punching section 35 (lateral edge detection sensor group 56) is expressed by L3 and the conveying speed of the sheet S is expressed by V, the time after the lapse of a period expressed by (L3/V+X/2) from the timing when the skew detection sensor 62 detects the forward edge of the sheet is the timing when the center of the forward edge of the sheet S is conveyed into the hole punching section 35. This timing is equivalent to the timing of detecting the forward edge of the sheet by the forward and rear edge detection sensor 57 of FIG. 10. That is, the time required for the sheet S to reach the hole punching section 35 from the skew detection unit 60 is calculated as (L3/V+X/2).

The rear edge of the sheet S is similarly detected. That is, the time after the lapse of a period expressed by (L3/V+X/2) from the detection of the passage of the rear edge of the sheet by the skew detection sensor 62 is the timing when the center of the rear edge of the sheet S passes the hole punching section 35.

This timing is equivalent to the timing of detecting the rear edge of the sheet by the forward and rear edge detection sensor 57 of FIG. 10. In this manner, position information of the sheet with respect to the hole punching section 35 is calculated. Therefore, if the conveying motor 59 is stopped as it is triggered by the timing of detecting the rear edge of the sheet S, punching processing can be executed at that stop position.

Thus, as the control unit 70 having the arithmetic operation function is employed, the skew detection sensors 61 and 62 can also be used as the sheet forward and rear edge detection sensor and the number of components can be reduced.

Figure 21:
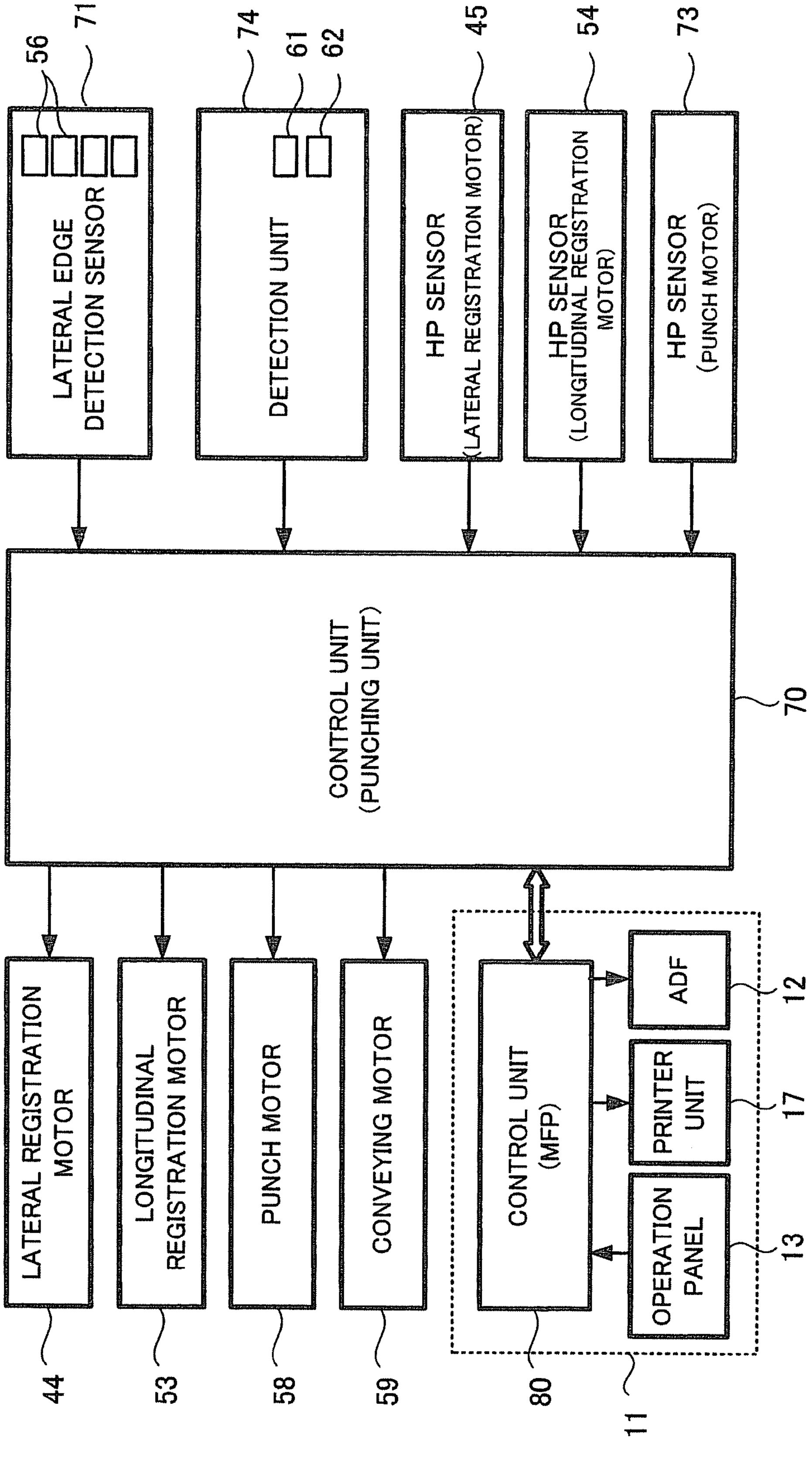
FIG. 21 is a block diagram showing a control system of the sheet processing apparatus according to the fourth embodiment of the invention.

FIG. 21 is a block diagram showing the control system of the sheet processing apparatus according to the fourth embodiment of the invention. In FIG. 21, the result of detection from a detection unit 74 including the sensors 61 and 62 is supplied to the control unit 70. The control unit 70 carries out skew detection and calculates position information in the conveying direction of the sheet S. Therefore, the control unit 70 has the functions of a skew detection unit and a position information calculating unit.

The control unit 70 also controls the longitudinal registration motor 53 in accordance with the result of skew detection, controls the tilt angle of the hole punching section 35 to perform skew correction, and controls movement of the hole punching section 35 in accordance with the result of lateral edge detection by the sensor group 56. The control unit 70 also controls operations such as deceleration and stop of the conveying motor 59 in accordance with the result of calculation of the forward edge and the rear edge of the sheet S. Moreover, the control unit 70 controls the punch motor 58 of the hole punching section 35 in accordance with the position information of the sheet S and thus controls the operation of punching processing.

In this way, according to the above embodiment of the invention, reduction in the number of sensors, saving of space, reduction in cost, and saving of power can be realized.

Although the punching mechanism 30 and the body 11 are configured as separate units in the above description, the punching mechanism 30 may be formed within the body 11. Also, though the punching mechanism 30 forms punch holes in a sheet outputted from the body 11 in the above examples, sheets may be sequentially conveyed into the punching mechanism 30 by using an inserter and punch holes may be formed in the sheets conveyed from the inserter.

Various modifications can be made without departing from the scope of the attached claims.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A sheet processing apparatus comprising:

a hole punching section arranged, in order to perform punching processing to a sheet conveyed thereto, orthogonally to a conveying path of the sheet;

a moving mechanism configured to move the hole punching section along a direction orthogonal to the conveying path and move the hole punching section in a direction toward a retreat position and a punching processing position;

a rotating mechanism which tilts the hole punching section in the conveying direction of the sheet;

a detection unit arranged upstream from the hole punching section and configured to move by being interlocked with the hole punching section and detect a lateral edge of the sheet conveyed thereto;

a control unit configured to control the moving mechanism in accordance with a result of detection by the detection unit and vary the position of the hole punching section, thus controlling the punching processing position with respect to the sheet; and a skew correction unit configured to control the rotating mechanism in accordance with a quantity of skew of the conveyed sheet, and carry out skew correction by changing tilt angle of the hole punching section;

wherein the control unit causes the hole punching section to be moved in the direction to the retreat position along the orthogonal to the conveying path with the conveying of the sheet, causes the hole punching section to retreat by a prescribed quantity with reference to the result of detection by the detection unit, then causes the hole punching section to be moved in the opposite direction, and controls movement to the punching processing position in accordance with the result of detection by the detection unit.

2. The sheet processing apparatus according to claim 1, wherein after performing punching processing to a preceding sheet, the control unit moves the hole punching section in a first direction toward the retreat position from that position as a starting point, and in the process of moving the hole punching section in the first direction, when the detection unit has detected the lateral edge of a subsequent sheet, the control unit further moves the hole punching section from there in the first direction by the prescribed quantity.

3. The sheet processing apparatus according to claim 1, wherein after performing punching processing to a preceding sheet, the control unit moves the hole punching section to a home position set at a central part of the conveying path, and moves the hole punching section in a first direction toward the retreat position from that position as a starting point, and in the process of moving the hole punching section in the first direction, when the detection unit has detected the lateral edge of a subsequent sheet, the control unit further moves the hole punching section from there in the first direction by the prescribed quantity.

4. The sheet processing apparatus according to claim 1, wherein the control unit controls and moves the hole punching section to the retreat position in an initial state.

5. The sheet processing apparatus according to claim 1, wherein the control unit causes the hole punching section to stand by at the retreat position with respect to the first page of sheet, of sheets that are sequentially conveyed thereto, and causes the hole punching section to stand by at a position that is reached by retreating by the prescribed quantity with respect to the next page and subsequent sheets.

6. The sheet processing apparatus according to claim 1, wherein the moving mechanism includes a stepping motor as a driving source for moving the hole punching section, and when moving the hole punching section by the prescribed quantity, the control unit drives the stepping motor at a preset number of pulses.

7. The sheet processing apparatus according to claim 1, wherein the lateral edge detection unit includes plural sensors arranged in an array in a direction orthogonal to the sheet conveying path, and the control unit selects one of the plural sensors for lateral edge detection in accordance with the size of the sheet that is conveyed.

8. The sheet processing apparatus according to claim 7, wherein the control unit confirms a relative positional shift in a direction of width of the sheet with respect to the hole punching section in accordance with the result of detection by the plural sensors, and if the sheet is shifted in a direction opposite to the retreat direction, the control unit carries out control to reduce the quantity of movement of the hole punching section in the retreat direction in accordance with the quantity of shift.

9. An image forming apparatus comprising:

an image forming unit having an operation panel and a printer unit for forming an image on a sheet;

a conveying motor for conveying the sheet outputted from the image forming unit along a conveying path;

a hole punching section arranged, in order to perform punching processing to a sheet conveyed thereto, orthogonally to the conveying path of the sheet;

a moving mechanism configured to move the hole punching section along a direction orthogonal to the conveying path and move the hole punching section in a direction toward a retreat position and a punching processing position;

a rotating mechanism which tilts the hole punching section in the conveying direction of the sheet;

a detection unit arranged upstream from the hole punching section and configured to move by being interlocked with the hole punching section and detect a lateral edge of the sheet conveyed thereto;

a control unit configured to control the moving mechanism in accordance with a result of detection by the detection unit and vary the position of the hole punching section, thus controlling the punching processing position with respect to the sheet; and a skew correction unit configured to control the rotating mechanism in accordance with a quantity of skew of the conveyed sheet, and carry out skew correction by changing tilt angle of the hole punching section;

wherein the control unit causes the hole punching section to be moved in the direction to the retreat position along the orthogonal to the conveying path with the conveying of the sheet, causes the hole punching section to retreat by a prescribed quantity with reference to the result of detection by the detection unit, then causes the hole punching section to be moved in the opposite direction, and controls movement to the punching processing position in accordance with the result of detection by the detection unit.

10. The image forming apparatus according to claim 9, wherein the lateral edge detection unit includes plural sensors arranged in an array in a direction orthogonal to the sheet conveying path, and the control unit selects one of the plural sensors for lateral edge detection in accordance with a sheet size designated by operation on the operation panel.

11. The image forming apparatus according to claim 10, wherein the control unit confirms a relative positional shift in a direction of width of the sheet with respect to the hole punching section in accordance with the result of detection by the plural sensors, and if the sheet is shifted in a direction opposite to the retreat direction, the control unit carries out control to reduce the quantity of movement of the hole punching section in the retreat direction in accordance with the quantity of shift.

* * * * *